United States Patent [19]

Robertson et al.

[11] Patent Number: 5,295,243
[45] Date of Patent: Mar. 15, 1994

[54] DISPLAY OF HIERARCHICAL THREE-DIMENSIONAL STRUCTURES WITH ROTATING SUBSTRUCTURES

[75] Inventors: George G. Robertson; Jock Mackinlay, both of Palo Alto; Stuart K. Card, Los Altos Hills, all of Calif.

[73] Assignee: Xerox Corporation, Stamford, Conn.

[21] Appl. No.: 66,311

[22] Filed: May 21, 1993

Related U.S. Application Data

[63] Continuation of Ser. No. 795,238, Nov. 15, 1991, abandoned, which is a continuation of Ser. No. 454,010, Dec. 29, 1989, abandoned.

[51] Int. Cl.$^5$ ............................................. G06F 15/00
[52] U.S. Cl. ..................................................... 395/160
[58] Field of Search ............... 364/518, 521, 522, 146, 364/147; 395/120, 137, 160, 152; 340/721, 729, 734

[56] References Cited

U.S. PATENT DOCUMENTS

| | | |
|---|---|---|
| 4,434,460 | 2/1984 | Drakenborn et al. ............... 364/200 |
| 4,613,946 | 9/1986 | Forman ............................... 364/518 |
| 4,649,499 | 3/1987 | Sutton et al. ....................... 364/518 |
| 4,710,763 | 12/1987 | Franke et al. ..................... 340/723 |
| 4,742,558 | 5/1988 | Ishibashi et al. .................... 382/56 |
| 4,752,889 | 6/1988 | Rappaport et al. ............. 364/188 X |
| 4,764,867 | 8/1988 | Hess ..................................... 364/200 |
| 4,794,528 | 12/1988 | Hirose et al. ........................ 364/300 |

(List continued on next page.)

FOREIGN PATENT DOCUMENTS 309374A 3/1989 European Pat. Off. .
323302A 7/1989 European Pat. Off. .

OTHER PUBLICATIONS

Fairchild, K. M., Poltrock, S. E., and Furnas, G. W., "SemNet: Three-Dimensional Graphic Representations of Large Knowledge Bases", in Guindon, R., Ed., Cognitive Science and its Application for Human Computer Interaction, Lawrence Erlbaum, Hillsdale, N.J., 1988, pp. 201-233.

(List continued on next page.)

Primary Examiner—Mark K. Zimmerman

[57] ABSTRACT

A processor presents a sequence of images of a hierarchical structure that is perceived as three-dimensional. The hierarchical structure includes conic substructures that can have vertical or horizontal axes. Each cone has a parent node at its vertex and children nodes along its base, each with a link to the parent node. Each child can in turn be at the vertex of another cone. The cones can be rotated in steps that produce the perception of object constancy for each node. For example, if the user requests that an indicated node be moved to a primary viewing position, each of the cones along the path from the indicated node to the root node is rotated in the direction that most directly moves the indicated node to the primary viewing position. Each node can include a selectable unit for indicating it, and a node can also include a grow tab that can be selected to request presentation of its children nodes and links to them. The user can request that the children nodes of a node be replaced by a grow tab. To reduce the computation necessary for each step of rotation, the position relative to a cone's axis for each of 80 points on the base of a cone is computed for a level of the hierarchy and is then stored in an array for subsequent use in positioning nodes on that level. The base point of each node on a rotating cone can then be changed in a linked node data structure, and its new position can then be obtained by simple arithmetic operations using the axis coordinates and the appropriate data from the array. The base of each array can be a polygon whose vertices are nodes, and the base shape can be presented as a shadow to provide additional information and strengthen the perception of three dimensions. Or, the profiles of the cones can be presented as a shadow.

22 Claims, 16 Drawing Sheets

U.S. PATENT DOCUMENTS

| | | | |
|---|---|---|---|
| 4,807,158 | 2/1989 | Blanton et al. | 364/521 |
| 4,821,211 | 4/1989 | Torres | 364/521 |
| 4,845,744 | 7/1989 | DeBenedictis | 379/221 |
| 4,868,766 | 9/1989 | Oosterholt | 395/120 |
| 4,944,023 | 7/1990 | Imao et al. | 382/37 |
| 4,982,344 | 1/1991 | Jordan | 364/521 |
| 5,008,853 | 4/1991 | Bly et al. | 364/900 |
| 5,010,500 | 4/1991 | Makkuni et al. | 364/521 |
| 5,021,976 | 6/1991 | Wexelblat et al. | 364/521 |
| 5,065,347 | 11/1991 | Pajak et al. | 395/159 |
| 5,072,412 | 12/1991 | Henderson, Jr. et al. | 395/159 |
| 5,107,443 | 4/1992 | Smith et al. | 395/158 |
| 5,224,209 | 6/1993 | Hirai et al. | 395/150 |
| 5,237,651 | 8/1993 | Randall | 395/148 |

OTHER PUBLICATIONS

Smith. A. R., "Plants, Fractals, and Formal Languages", in Computer Graphics, vol. 18, No. 3, Jul. 1984, pp. 1-10.

Robertson, G. G., Card, S. K., and Mackinlay, J. D., "The Cognitive Coprocessor Architecture for Interactive User Interfaces", Proceedings of the ACM SIGGRAPH Symposium on User Interface Software and Technology, Williamsburg, Va., Nov. 13-15, 1989, pp. 10-18.

Pope, S. T., Goldberg, A., and Leibs, D., "The ParcPlace Systems Navigator Applications and Frameworks", presented at ACM SigGraph Symposium on User Interface Software, Oct. 1988, Banff, Canada, pp. 1-30.

Cahn, D., "A PHIGS Technical Overview", *Using the PHIGS Standard,* Sigraph '87, Anaheim, Calif., Jul. 27-31, 1987, pp. 73-110.

European Search Report and Annex, Application No. EP 90314111.7, dated Nov. 28, 1991.

PRIMARY VIEWING
POSITION

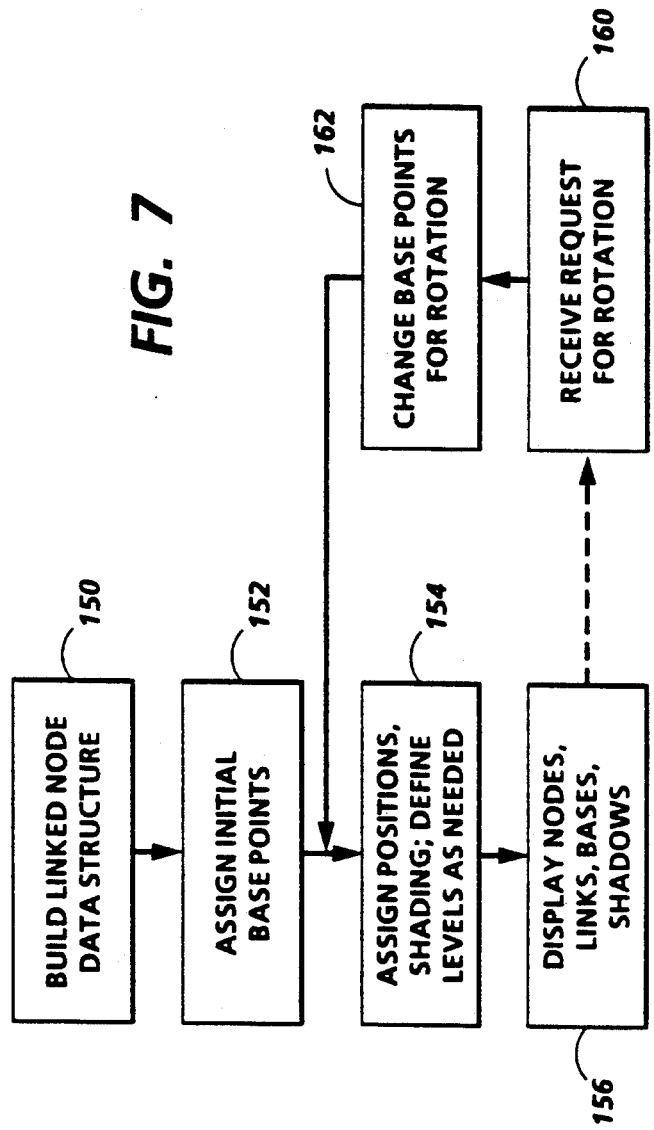

DISPLAY OF HIERARCHICAL THREE-DIMENSIONAL STRUCTURES WITH ROTATING SUBSTRUCTURES

This is a continuation of application Ser. No. 07/795,238, filed Nov. 15, 1991, now abandoned which was a continuation of application Ser. No. 07/459,010, filed Dec. 29, 1989, now abandoned.

BACKGROUND OF THE INVENTION

The present invention relates to techniques for display presentation of a structure that includes nodes and links in three dimensions. More specifically, the invention relates to a presentation in which the geometry of the node-link structure can change.

Fairchild, K. M., Poltrock, S. E., and Furnas, G. W., "SemNet: Three-Dimensional Graphic Representations of Large Knowledge Bases," in Guindon, R., Ed., *Cognitive Science and its Application for Human Computer Interaction*, Lawrence Erlbaum, Hillsdale, N.J., 1988, pp. 201-233, describe SemNet, a three-dimensional graphical interface. SemNet presents views that allow users to examine local detail while maintaining a global representation of the rest of the knowledge base. SemNet also provides semantic navigation techniques such as relative movement, absolute movement, and teleportation. As shown and described in relation to FIG. 1-1, SemNet represents a knowledge base as a directed graph in a three-dimensional space, with elements of knowledge represented as labeled rectangles connected by lines or arcs. As noted on page 206, the nodes of the network could represent the antecedents and consequents of rules and the arcs could represent implication. Section 3.2, on pages 209-213, describes techniques, including multidimensional scaling and heuristics, that move related knowledge elements close together and unrelated knowledge elements far apart, and section 3.3, on pages 213-214, describes how these techniques can be used with personalized positioning. Section 5.2.4, on pages 227-228, describes hyperspace movement, in which the nodes connected to a selected knowledge element are temporarily moved to positions around it, and then snap back to their original positions after a new node is selected.

SUMMARY OF THE INVENTION

The present invention provides techniques for presenting a three-dimensional node-link structure with a hierarchical geometry within which the relative positions of nodes and links can change without losing the perceived object constancy of the nodes or links or of the structure as a whole. When a user selects a part of the structure, the selected part can be brought to a primary viewing position by changing the geometry of the structure without loss of object constancy. The hierarchical geometry can be a hierarchy of conic substructures, each with a parent node at its vertex and with children nodes along a directrix, with each conic substructure aligned so that it can rotate about an axis. In response to a user selection, the selected part is moved to the primary viewing position by a sequence of steps in which each conic substructure rotates as appropriate.

One aspect of the invention is based on the recognition of a problem in presenting three-dimensional node-link structures, especially large structures with many nodes and links. A node-link structure often represents a data structure, with each node representing an item of data within the data structure. A user viewing such a structure frequently wishes to change from a view of one part of the structure to a view of another. Some conventional techniques allow the user to change point of view in relation to the structure without changing the geometry of the structure. Other conventional techniques allow the user to obtain a view of a completely different geometry that includes a different collection of nodes and links. But sometimes the user needs a relatively small change in the geometry to facilitate the viewing of a particular part.

This aspect is further based on the discovery that this problem can be alleviated by presenting a node-link structure with a geometry that can change while the perceived object constancy of the nodes and links is maintained. An example of such a geometry is a hierarchy of conic substructures, each with a parent node at its vertex and with children nodes along its base or other directrix, with each conic substructure aligned so that it can rotate about an axis. If the conic substructures are aligned with their axes parallel and if each level of the hierarchy has a fixed perceived link length at an appropriate orientation, for example, the conic substructures can all rotate independently of each other without changing the perceived object constancy of the nodes and links.

These features can be implemented in a system that includes a processor that provides image data to an image output device. In response, the image output device presents a sequence of images that include node-link structures that are perceptibly different but whose nodes and links are perceptible as continuing through the sequence. The system can also include a user input device such as a mouse with which a user can indicate a node on the directrix of one of the conic substructures. The sequence can be provided in response, with conic substructures rotating to move the indicated node to a primary viewing position.

These features are especially useful in providing a display representing a large data structure, such as a Unix directory or an artificial intelligence knowledge structure, which has many more items than can be presented in two dimensions on a screen. Using the techniques of the invention, as many as 600-800 items or more can be presented in a three-dimensional hierarchical structure that fits on the screen. The user can view and manipulate the structure to find information of interest. The perceived object constancy prevents confusion during operations manipulating the structure.

Closely related aspects of the invention are based on the recognition of competing considerations in rotating a hierarchy of conic substructures to move a node to the primary viewing position. If the rotation is made in large steps, the motion will be jumpy; with very large steps, object constancy will be lost. But if the rotation is made in small steps, and if the structure is sufficiently complex to require substantial computation for each step, the rotation may be unsatisfactorily slow.

These competing considerations can be resolved to an extent by rotating the levels of the hierarchy independently to provide an optimal sequence of steps having a selected node to the primary viewing position. If appropriate, a conic substructure at an upper level can rotate in a direction opposite that of a conic substructure at a lower level that has its vertex on the base or other directrix of the upper conic substructure. As a result, the steps at each level can be performed concurrently, reducing the number of steps of rotation and the time necessary to complete the rotation.

The time necessary for computation of each step of rotation nevertheless limits the speed of rotation. Another aspect of the invention reduces the time necessary for computation by determining the position of each conic substructure at the time it is first displayed. If the determined position is a position relative to the axis of rotation, it need not be recomputed, but can be held in a data structure and used for each subsequent step of rotation, considerably reducing the computation required.

Other related aspects of the invention are based on the recognition that a user viewing a complex three-dimensional node-link structure finds it difficult to obtain information about some of its detailed features. The user may, for example, have difficulty determining how many children nodes are linked to a given parent node or determining which nodes are in the hierarchy above a given child node.

Information about some detailed features of the structure can be provided through shadows that reinforce the perception of the structure in three dimensions. The shadows can, for example, be on a plane that is perceived as receding toward a vanishing point of the image and that suggests an illumination of the structure to produce the shadow.

Information about the number of children nodes in a conic substructure can be provided with a polygonal shadow having a vertex for each child node. This polygonal shadow can have the same shape as a directrix of the conic substructure at which the children nodes are positioned, so that the shape of the base can be determined once and can be used both in presenting the structure and in presenting the shadow. The shadow can be positioned as a projection of the base onto a plane that is perceptible as parallel to the plane of the base.

Information about the number of children nodes and about the connections of nodes can also be provided with a shadow positioned as a projection of a profile of the conic substructure onto a plane that is perceptible as parallel to the substructure's axis. The profile shape can be defined by two links positioned at the extremes of the substructure in the profile, and the positions of those links can be determined once and used both in presenting the structure and in presenting the shadow. If each child node includes a planar selectable unit and the plane of the shadow is perpendicular to the planes of the selectable units, then each child node will appear as a line shadow extending from the profile shadow.

In addition, the user can obtain information about the path of links and nodes connecting a specific node to the uppermost node. When the user indicates a node's selectable unit, the path is presented differently so that the user can more easily distinguish the path. For example, the colors of the links and nodes in the path could be modified or inverted or the path could be highlighted in another way.

Another aspect of the invention allows the user to reduce the part of a hierarchical structure that is presented for display, so that features of the remaining part are more easily discerned. The user can indicate a node and request that the substructure depending from it not be displayed; in response, the substructure can be removed from the image and the node can be changed to include a selectable unit for recreating the substructure. Similarly, the user can indicate a node and request that any substructure that does not depend directly from the node or from one of its ancestors or descendants be replaced by such a selectable unit.

The following description, the drawings and the claims further set forth these and other objects, features, and advantages of the invention.

BRIEF DESCRIPTION OF THE DRAWINGS

FIG. 7 is a flow chart showing general steps in presenting a structure like those in FIGS. 1 and 2.

FIG. 8 is a schematic diagram of a data item for a node in a linked node data structure that can be used in providing a structure like those in FIGS. 1 and 2.

Detailed Description

A. Conceptual Framework

Figure 1:
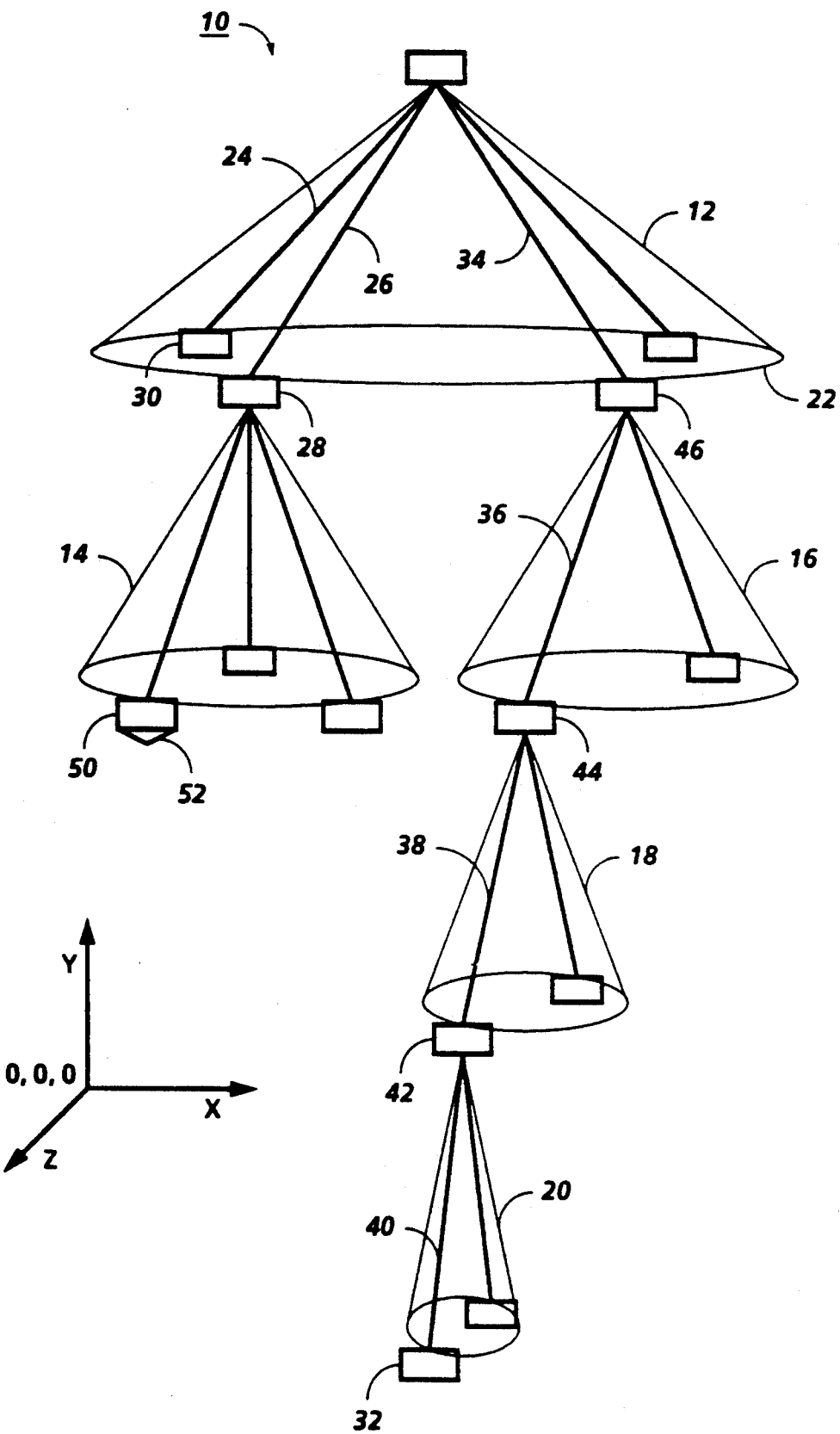
FIG. 1 is a display view showing a hierarchical structure with conic substructures that can rotate about vertical axes according to the invention.

The following conceptual framework is helpful in understanding the broad scope of the invention, and the terms defined below have the meanings indicated throughout this application, including the claims. This conceptual framework is a modification and extension of those set forth in the following copending, coassigned U.S. patent applications, all of which are incorporated herein by reference: U.S. patent application Ser. No. 07/030,766, entitled "User Interface with Multiple Workspaces for Sharing Display System Objects," now issued as U.S. Pat. No. 5,072,412; U.S. patent application Ser. No. 07/195,230, entitled "Accelerating Link Creation," now issued as U.S. Pat. No. 4,982,344; and U.S. patent application Ser. No. 07/241,525, entitled "Private Regions Within a Shared Workspace," now issued as U.S. Pat. No. 5,107,443."

A "data processing system" is a system that processes data. A "data processor" or "processor" is any component or system that can process data, and may include one or more central processing units or other processing components. A "user input device" is a device such as a keyboard or a mouse that can provide signals based on actions of a user. An "image output device" is a device that can provide an image as output. A "display" is an image output device that provides information in visible form, such as on the screen of a cathode ray tube. The visible pattern presented by a display is an "image."

A wide variety of display techniques for data processing systems are available including, for example, various graphical user interfaces, but, despite their diversity, these techniques tend to have certain common characteristics. One fundamental common characteristic is that a display produces human perceptions. In this application, the term "display feature" refers to any human perception produced by a display.

A "structure" is a display feature that includes other display features within it, all of which appear to be connected into a unity.

A "node-link structure" is a structure that includes display features that can be distinguished into "nodes" that are localized and "links" that extend between and connect the nodes. In the limit, a node can be localized to a just perceptible point and a link can be a just perceptible line extending between nodes, but all that is necessary for a node-link structure is that the nodes are sufficiently localized and the links are sufficiently extended that nodes and links are distinguishable.

A "three-dimensional structure" is a structure that is perceived as extending in three orthogonal dimensions. Typically, a display will have a two-dimensional display surface and the perception of the third dimension will be produced with visual cues such as obscuring of distant objects by near objects, size changes in objects that change distance as in perspective drawing, and different shading of objects at different distances.

A "hierarchical structure" is a structure that is perceptible as having a number of levels. A hierarchical node-link structure, for example, could have a number of levels of nodes, with links connecting each node on a lower level to one of the nodes on an upper level. Each node could represent a node in a tree data structure or in another directed graph data structure that is organized into levels.

A "conic substructure" is a part of a hierarchical structure that is perceptible as having a conic shape with a circular or polygonal directrix as its base. If the hierarchical structure has nodes and links, for example, a parent node could be at the vertex of a conic substructure and its children nodes could be on the base or another directrix of the conic substructure, connected to the parent node by links that produce the perception of a conic shape.

A second display feature is perceptible as a "continuation" of a first display feature when the presentation of the second display feature follows the presentation of the first display feature in such a way that the user perceives the first display feature as being continued when the second display feature is presented. This can occur when the successive display of two display features is so close in time and space that they appear to be the same display feature. An example of this is the phenomenon called "object constancy."

If a second conic substructure is perceptible as a continuation of a first conic substructure, it may also be perceptible as a "rotated continuation" if presentation of the second conic substructure produces the perception that the first conic substructure has rotated about an axis.

Two node-link structures are "perceptibly different" or "perceptible as different" when they can be perceived as including different nodes or links or as including nodes and links that are positioned differently in relation to each other. For example, even where first and second node-link structures are presented in such a way that the nodes and links of the second structure all appear to be continuations of the nodes and links of the first structure, the two structures may still be perceptibly different if the nodes and links within the second structure are positioned differently in relation to each other than the nodes and links within the first structure. But first and second node-link structures presented in such a way that the nodes and links all appear to be continuations would not be perceptibly different if merely viewed from a different point of view, at a different scale, or with a different texture, coloration, background, illumination, or other non-structural difference. Therefore, an affine transformation of a first node-link structure, by itself, does not produce a second node-link structure that is perceptible as different than the first node-link structure. A "selectable unit" is a display feature that is perceived as a bounded display area that can be selected. The term "select," when used in relation to a selectable unit, means a user input operation that includes a signal that uniquely indicates the selectable unit. The user can, for example, use a pointing device such as a mouse to select a selectable unit by indicating its position on a display and clicking a button on the pointing device. In general, a selectable unit may take any appearance, and is not limited to a visually distinguishable feature or set of features that appears to be a coherent unity.

B. General Features

Figure 2:
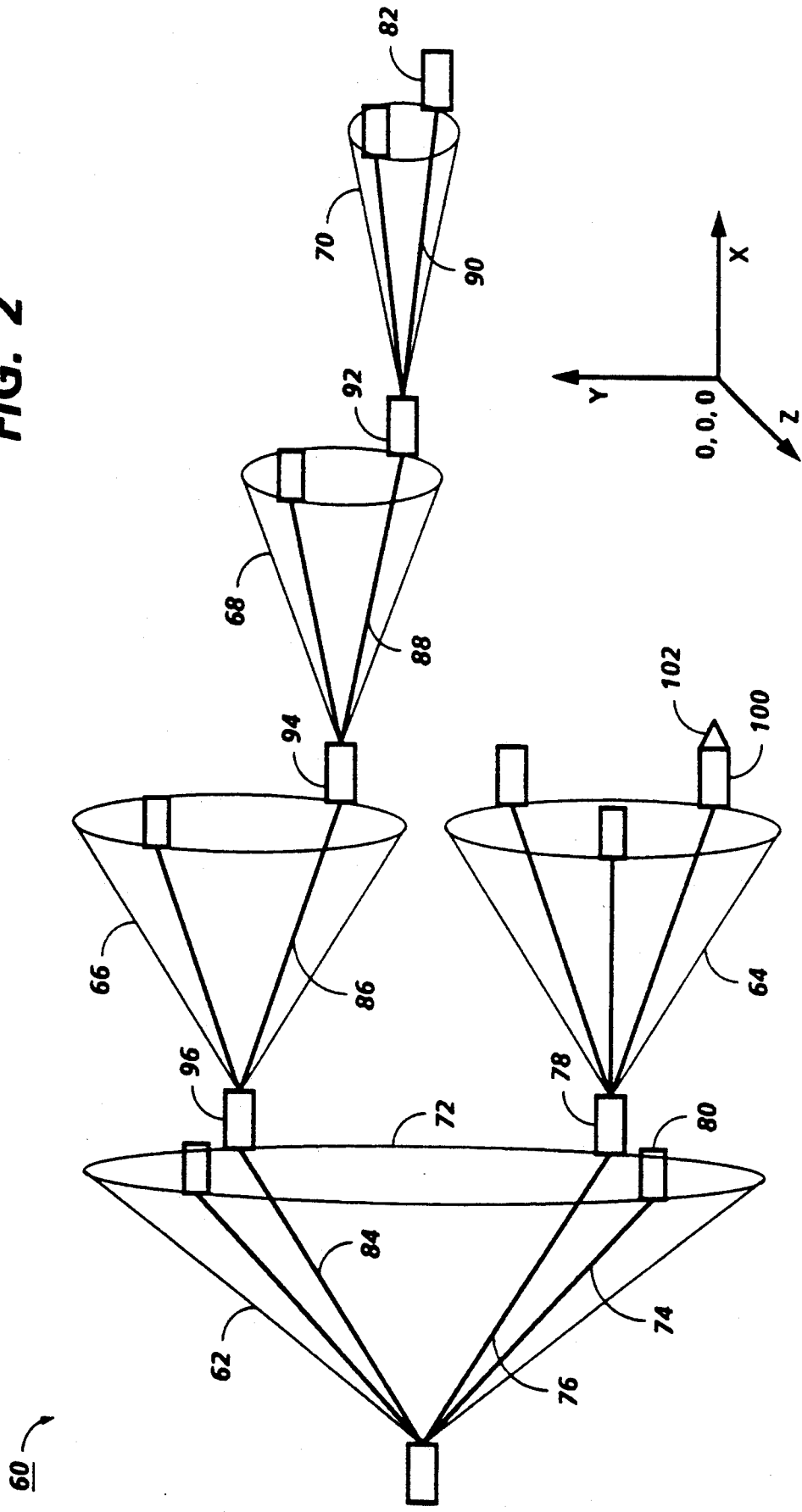
FIG. 2 is a display view showing a hierarchical structure with conic substructures that can rotate about horizontal axes according to the invention.

FIGS. 1–6 illustrate general features of the invention. FIGS. 1 and 2 show three-dimensional hierarchical structures with conic substructures that can rotate while preserving object constancy. The structure of FIG. 1 is vertically oriented, and the structure of FIG. 2 is horizontally oriented. FIGS. 3–6 show partial plan views illustrating rotation of the conic substructures to move a selected node to a primary viewing position.

In FIG. 1, structure 10 includes conic substructures 12, 14, 16, 18, and 20 in hierarchical levels. Several cues within structure 10 allow a human to perceive it as three-dimensional. For example, the bases or directrices of the conic substructures, illustratively elliptical as can be seen from base 22 of conic substructure 12, are perceptible as tilted circles receding from the viewing point. Also, the links, illustratively of different lengths as can be seen from links 24 and 26, are perceptible as having equal length due to some links being closer to the viewing point than others. And the nodes, illustratively including selectable units of different sizes as can be seen from nodes 28 and 30, are perceptible as of equal size due to some nodes being closer to the viewing point than others.

As can be understood from FIG. 1, an image of structure 10 could be followed by a sequence of images in which each of the conic substructures is replaced by a series of similar conic substructures that are perceptible as slightly rotated continuations, rotating about vertical axes. For example, if a user indicated node 32 and requested that it be moved to a primary viewing position closest to the viewer, conic substructures 20, 18, 16, and 12 could rotate to move node 32 to the requested position.

Viewing structure 10 from above, the rotation to move node 32 to the primary viewing position could be as follows: Substructures 20, 18, and 16 could rotate counterclockwise. Substructure 12 could rotate clockwise. These rotations could be concurrent, and could continue until links 34, 36, 38, and 40 are all aligned toward the primary viewing position. Nodes 42, 44, and 46 would also be in the primary viewing position.

In FIG. 2, structure 60 includes conic substructures 62, 64, 66, 68, and 70 in hierarchical levels. As in FIG. 1, several cues within structure 60 allow a human to perceive it as three-dimensional, including: the elliptical bases as can be seen from base 72 of conic substructure 62; the links of different lengths as can be seen from links 74 and 76; and the nodes including selectable units of different sizes as can be seen from nodes 78 and 80.

As discussed in relation to FIG. 1, an image of structure 60 could be followed by a sequence of images in which each of the conic substructures is replaced by a series of similar conic substructures that are perceptible as slightly rotated continuations, rotating about horizontal axes. For example, viewing structure 60 from the left, the rotation to move node 82 to the primary viewing position could be as follows: Substructures 70, 68, and 66 could rotate counterclockwise. Substructure 62 could rotate clockwise. These rotations could be concurrent, and could continue until links 84, 86, 88, and 90 are all aligned toward the primary viewing position. Nodes 92, 94, and 96 would also be in the primary viewing position.

In either structure 10 or structure 60, the user could request that a node be moved to the primary viewing position by selecting that node's selectable unit. Nodes 50 and 100, in addition to selectable units for requesting that they be moved, also include selectable units 52 and 102, called "grow tabs." The user can select the grow tab of a node to request presentation of its children nodes, which are not displayed when the grow tab is displayed, together with links that connect the node to its children.

Figure 3:
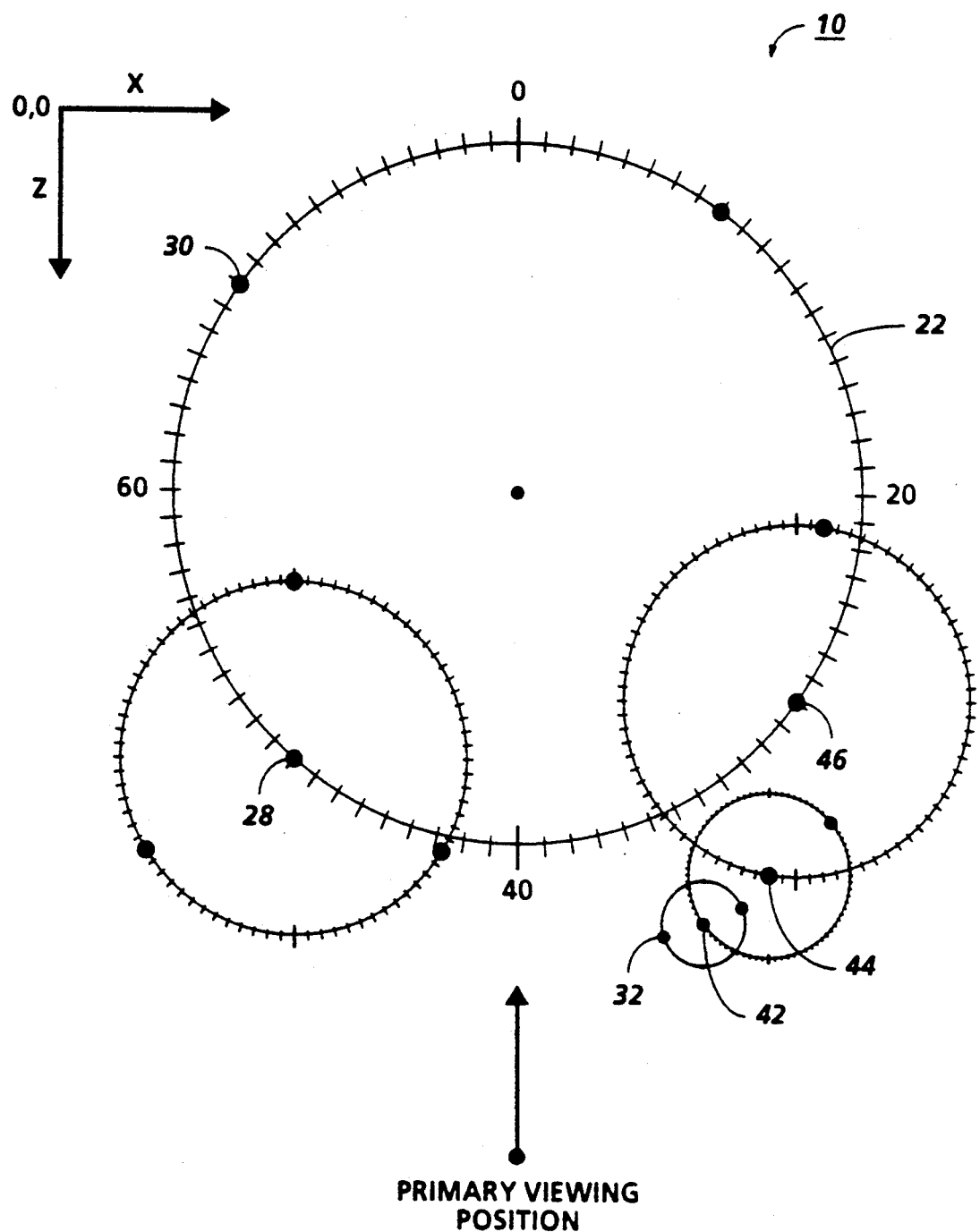
FIG. 3 is a schematic partial plan view of the hierarchical structures of FIGS. 1 and 2.

FIG. 3 shows a partial plan view of structure 10 in FIG. 1, viewed from above as if it existed in three-dimensions. FIG. 3 omits the links and the selectable units, and shows each node as a large dot. The base of each conic substructure is shown as a circle, with 80 points defined on it as discussed in more detail below. The same features would appear in a view of structure 60 in FIG. 2 from the left, i.e. with the x axis replaced by the y-axis. For example, base 22 is equivalent to base 72; nodes 28, 30, 32, 42, 44, and 46 are equivalent respectively to nodes 78, 80, 92, 94, 96.

Figure 4:
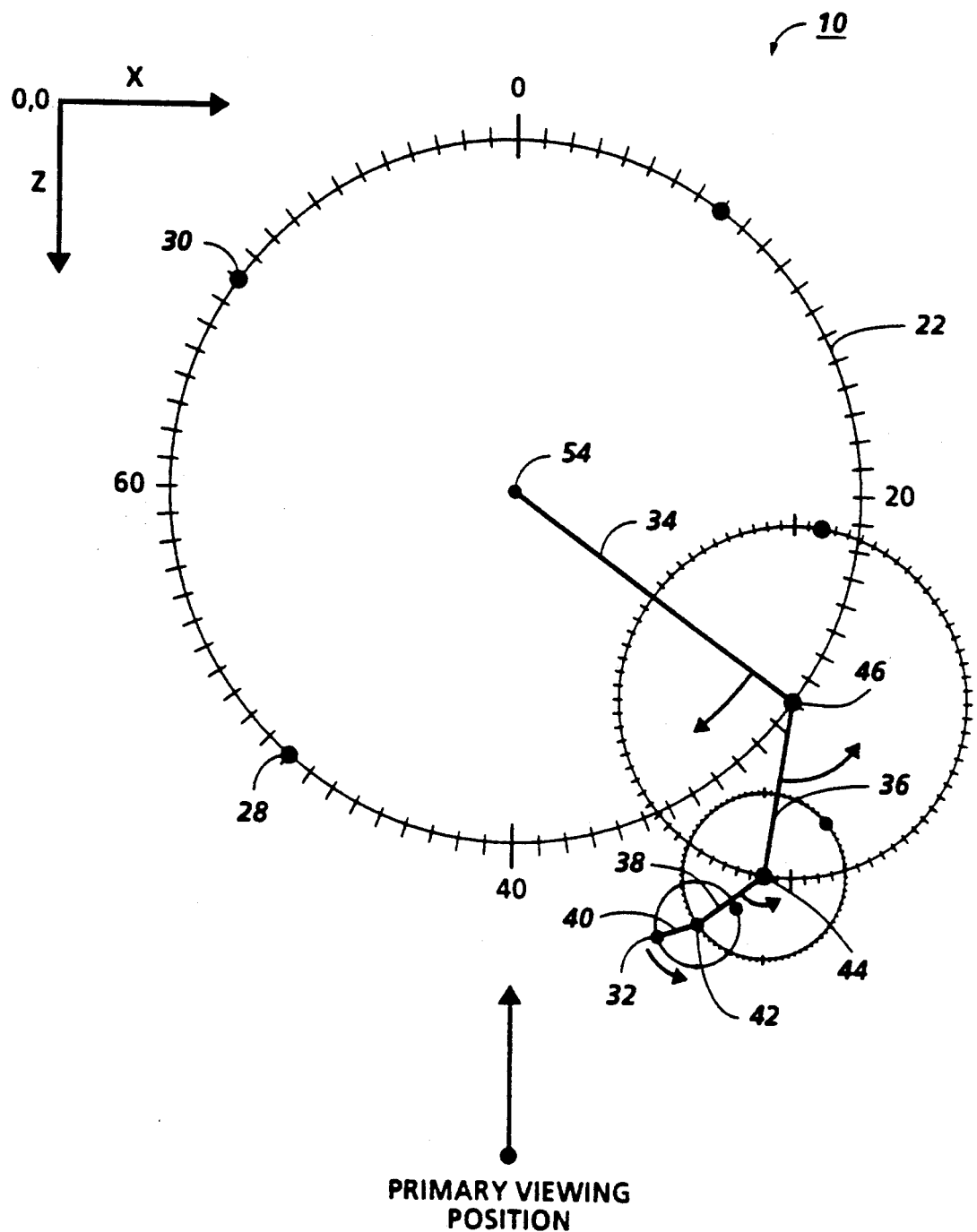
FIGS. 4, 5, and 6 are schematic partial plan views showing successive steps in the rotation of the conic substructures to bring a selected node to a primary viewing position.
Figure 5:
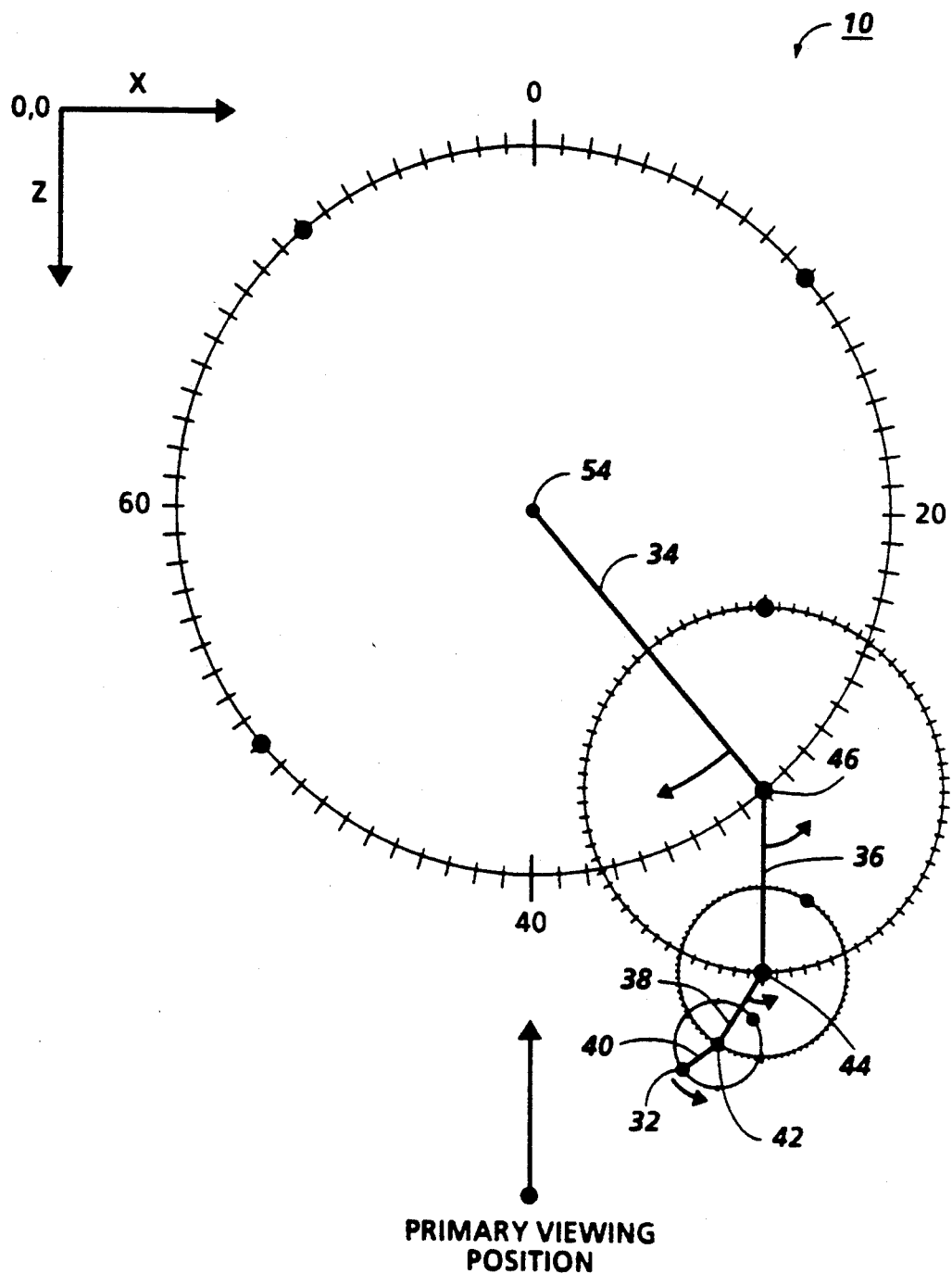
Figure 6:
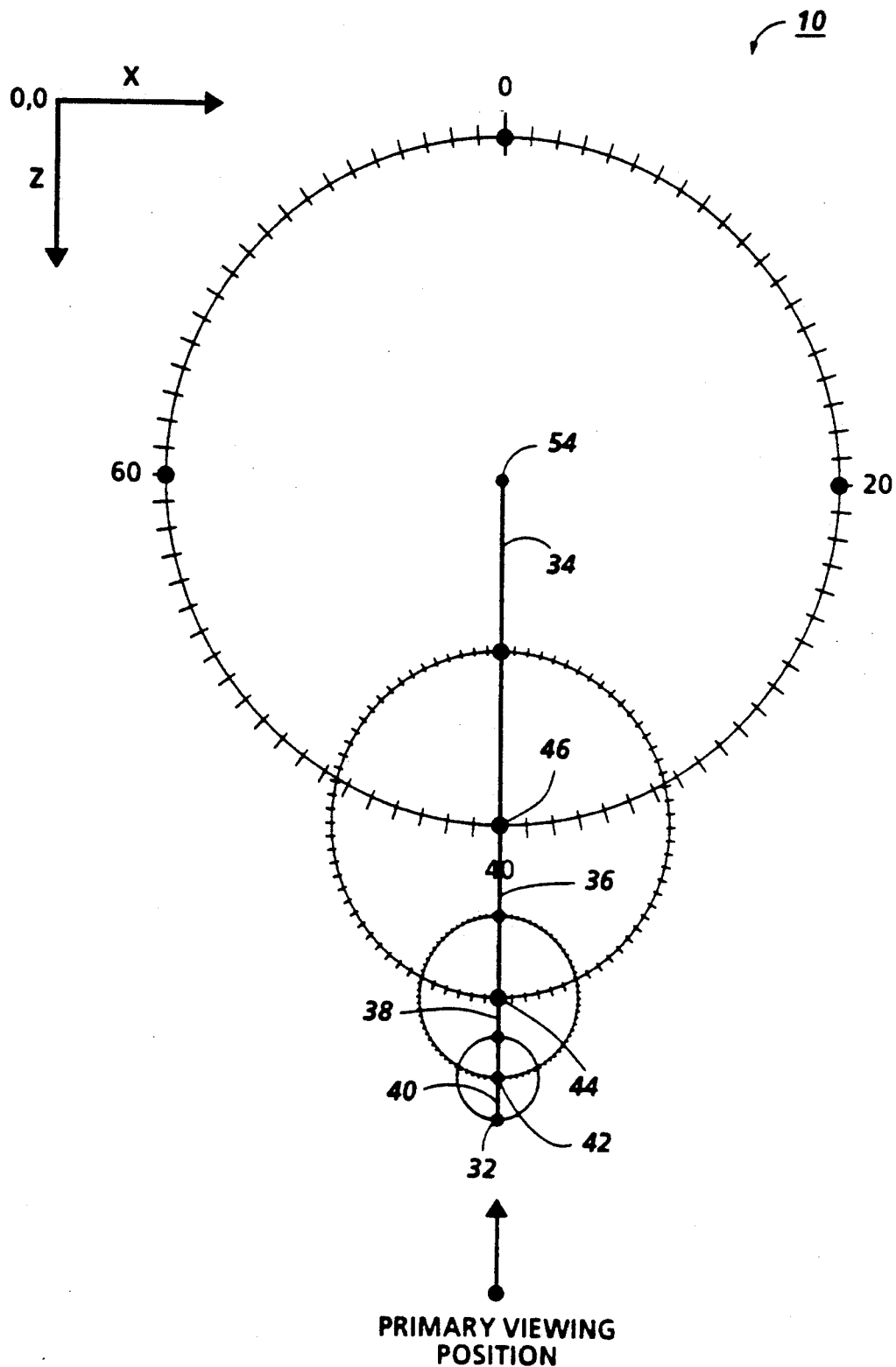

FIGS. 4-6 show partial plan views of steps in a sequence of structures that are perceptible as continuations of structure 10, and in which equivalent parts are labeled with the same reference numbers as in structure 10 in FIG. 1. These steps could occur in response to a request from a user to move node 32 to the primary viewing position shown. This request could be made by selecting the selectable unit in node 32.

In response to the user request, the path leading from node 32 to root node 54 is presented differently than other nodes and links in structure 10 so that the user can more readily distinguish it from other paths, as suggested in FIG. 4. Then, from the initial positions in FIG. 4, conic substructures 12, 16, 18, and 20 are perceptible as rotating to the intermediate positions in FIG. 5 and ultimately to the final positions in FIG. 6. As shown in FIGS. 4 and 5, the direction of rotation of conic substructures 16, 18, and 20 can be opposite that of conic substructure 12. Also, the necessary rotations can be performed concurrently to move node 32 to the primary viewing position more quickly.

C. An Implementation

The general features shown in FIGS. 1-6 could be implemented in many ways. FIG. 7 shows general steps performed by the current implementation, which runs on a Silicon Graphics workstation. FIG. 8 shows an item in a data structure that is used to perform the steps in FIG. 7.

The step in box 150 in FIG. 7 produces a linked node data structure that can include data defining a hierarchical structure as in FIGS. 1 and 2. FIG. 8 shows node data item 180 from such a linked node data structure, and node data item 180 supports one of the nodes in a hierarchical structure. Item 180 includes UID field 182 for the unique identifier (UID) of the item, and parents' UID field 184 and children's UID field 186 include the UIDs of linked node data items. The step in box 150 produces a data structure in which these three fields define a tree, i.e. a rooted directed acyclic graph in which each node except the root has one and only one parent. The tree can be divided into hierarchical levels, with each node other than the root node being on a hierarchical level below the root node. Such a data structure could be produced by well known techniques from a wide variety of databases, including any directed graph, provided that the non-tree links are not so numerous that they interfere with presentation of the hierarchical structure. A similar data structure with more than one root node could be used to provide a multiply hierarchical structure.

The other fields of item 180 include position field 188, for data indicating the three-dimensional coordinates of a node; data field 190, for data such as a word to be presented in the node's selectable unit; shrunken flag field 192, for data indicating whether the node includes a grow tab selectable unit that can be selected to present a substructure in the next level below the node; color field 194, for data indicating the color of the node's selectable unit, which provides a three-dimensional cue; base point field 196, for data indicating the node's position on the base of a conic structure by indicating one of the defined points on the base; selected path field 198, for data indicating whether the node is on a selected path between a node being moved to the primary viewing position and the root node; and child on path field 200, for data indicating which of the node's children nodes is on the selected path, if any. Item 180 can include additional fields as appropriate.

After a linked node data structure has been produced in box 150, subsequent steps in FIG. 7 can operate on the data structure to complete or modify the hierarchical structure it defines. The step in box 152, for example, scans through the linked node data structure completing base point field 196 for each node based on the number of children nodes its parent has. As shown in FIG. 3, each conic substructure's base may have 80 defined points, so that two children nodes may be assigned base points 0 and 40; three children nodes may be assigned base points 0, 26, and 53; four children nodes may be assigned base points 0, 20, 40, and 60, and so forth. If there are more children nodes than the number of base points, more than one child could be assigned to some of the base points or the number of base points could be increased.

The step in box 154 also scans the linked node data structure, completing position field 188 for each node and completing color field 194 based on each node's position so that the color of its selectable unit provides a three-dimensional cue. This step includes defining the sizes of conic substructure bases on each level and the position of each base point in relation to the axis of its conic substructure, based on the number of levels of the hierarchial structure to be presented. The step in box 156 then scans the linked node data structure and provides each node at its position for display, together with data defining the links, the conic substructure bases, and shadows as discussed in greater detail below.

After the structure is presented for display, the user may request a rotation operation, in box 160. In response, the step in box 162 changes base point field 196 for each affected node to perform a step of the rotation before returning to the step in box 154. Depending on the nature of the requested rotation, the steps in boxes 162, 154, and 156 may be repeated several times to complete the requested rotation, as discussed below.

1. Assigning Base Points

Figure 9:
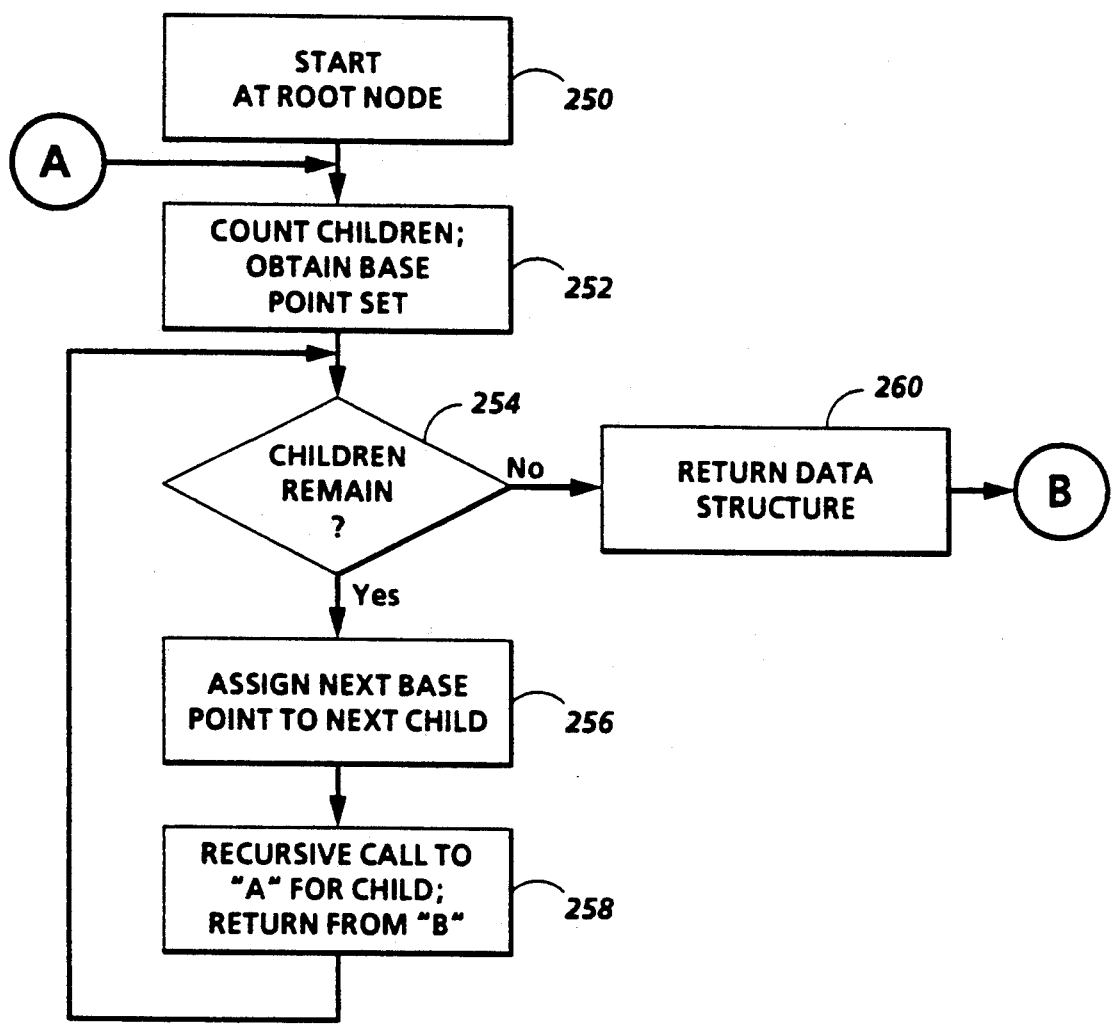
FIG. 9 is a flow chart showing steps in assigning initial base points in FIG. 7.

Base point field 196 for each node can initially be completed in box 152 in FIG. 7 by steps as shown in FIG. 9. The step in box 250 begins at the root node's item in the linked node data structure and the remaining steps perform a scan of the data structure, completing base point field 196 in each node's item.

The step in box 252 prepares to assign base points to the children of the node currently being handled. To do so, this step counts the number of children's UIDs in field 186. If more than one are counted, a set of points on the base of a conic substructure is selected according to the count, as in the examples given above. If there is only one UID in field 186, a special value is selected to indicate that the single child node will be on the axis of the conic substructure rather than at the perimeter of its base.

The step in box 254 begins an iterative loop that handles each of the children nodes, accessing each child node using its UID from field 186. The step in box 256 assigns the next base point from the set selected in box 252 to the next child node, completing field 196 in its item in the data structure. The step in box 258 then makes a recursive call for the child node being handled, so that base point field 196 is similarly completed for each of its children nodes. This recursive call enters the steps in FIG. 9 before box 252 and exits after the test in box 254 indicates that there are no children or that all children have been handled, as shown by the circled letters A and B.

If no children of the root node are counted in box 252, or when all children of the root node have been handled by the iterative loop, the step in box 260 returns the data structure. Field 196 is now completed in preparation for initial presentation of the hierarchical structure.

2. Assigning Positions and Defining Levels

Figure 10:
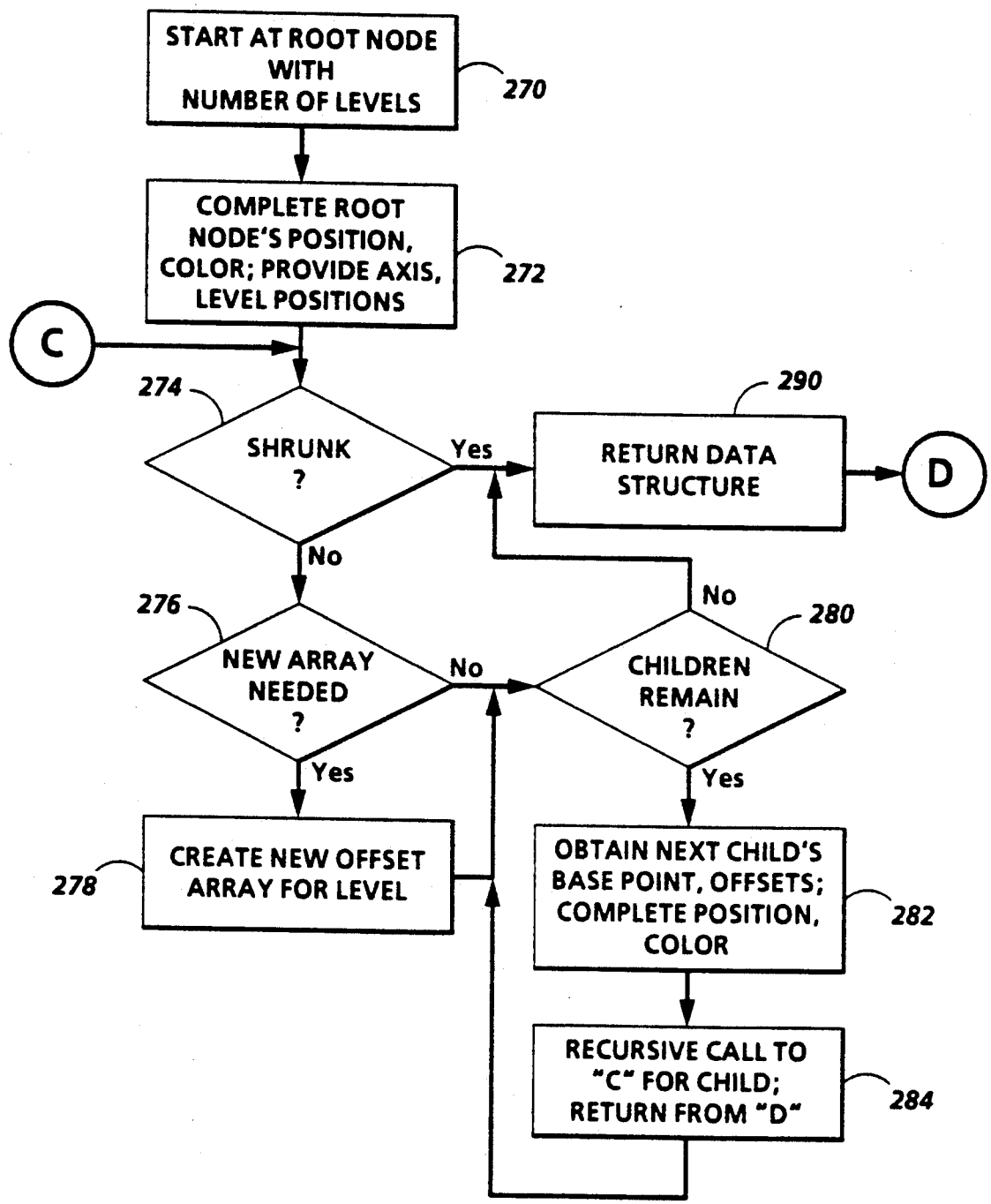
FIG. 10 is a flow chart showing steps in assigning positions in FIG. 7.

Position field 188 and color field 194 can be initially completed in box 154 in FIG. 7 and can be subsequently updated by the steps in FIG. 10. As in FIG. 9, the first step, in box 270, begins at the root node's item in the linked node data structure and the remaining steps perform a scan of the data structure, completing position field 188 and color field 194 in each node's item. The steps in FIG. 10 also reduce the use of transcendental functions such as sines and cosines to calculate each node's position, as explained in greater detail below.

The step in box 270 begins with data indicating the number of levels in the hierarchical structure to be presented for display. This data could be obtained by one of the steps in boxes 150, 152, and 162 in FIG. 7. If none of the nodes at a given level of the linked node data structure have children, that is the lowest level of the structure to be presented, and the number of hierarchical levels can be determined by counting the number of nodes in the path between one of the nodes at that level and the root node.

The step in box 272 assigns a predefined position to the root node and completes the root node's color field 194. The root node is positioned on the central axis of the structure. If, for example, the axis extends in the y-dimension, the x- and z-coordinates of the root node define the position of the axis, and the y-coordinates of the bases of the levels can be determined by dividing the available length in the y-dimension by the number of levels obtained in box 270. The axis coordinates and the y-coordinates of the levels are provided for use in subsequent steps.

The step in box 274 tests whether the shrunken flag field 192 of the node being handled indicates that its children should not be presented. If not, the step in box 276 then branches to create a new offset array for the level of the children, if necessary. This branch is not taken if the node has only one child or if an offset array for the child's level already exists and the number of levels has not increased. But if there is more than one child and there is no array or the number of levels has increased, a new offset array is created in box 278.

Each offset array contains a respective offset for each base point value, and this offset can be combined through simple, rapid arithmetic operations such as translations in the x- and z-dimensions using the coordinates of the current axis and the level's y-coordinate to obtain a position on the base of the conic substructure. This avoids the need to perform transcendental functions except when a new array is created in box 278.

In creating a new offset array, the step in box 278 first obtains the base size for the respective level. The base size for the uppermost hierarchical level, which can have no more than one conic substructure, can be a predetermined base radius that depends on the parameters of the display. The base sizes for a lower level can be base radii, $r_i$, that are computed by dividing the uppermost level base radius by $2^{i+1}$, where i is the number of levels to the lower level. This provides satisfactory base sizes if i is less than ten; for levels lower than the tenth, the base sizes it provides will be too small.

Using the base size, the step in box 278 produces an array of coordinate offsets from the center of the base to each of a predetermined number of equally spaced points on the base. This step employs the transcendental functions. FIG. 3 illustrates the case where coordinate offsets for 80 points are found, and most conventional graphics libraries use 80 points to draw a circle. But fewer than 80 points would suffice for a smaller base, as long as the number of points is sufficient that the perception of rotation of the conic substructure can be obtained with the resulting point spacing. For a structure that is presented with axes extending in the y-dimension, each array can thus be an array of ordered pairs $\{(X_0,Z_0)\ldots(X_{79},Z_{79})\}$ in which each offset can be a floating point number. The arrays can be combined or otherwise manipulated for compact storage and speedy retrieval. The following formulas can be used to obtain the arrays: $X_0=0.0$; $Z_0=-r_i$; $X_i=X_{i-1}\cos\theta+Z_{i-1}\sin\theta$; and $Z_i=Z_{i-1}\cos\theta-X_{i-1}\sin\theta$, where $\theta=2\pi/80$.

The step in box 280 then begins an iterative loop that handles each of the children of the node being handled. For the child being handled, the step in box 282 accesses its base point field 196 to obtain its base point, then accesses the appropriate offset array to obtain its offsets, or obtains zero offsets if there is only one child, to complete position field 188 and color field 194. The color field can be completed with a value that provides a shading gradient from the front to the rear of the perceived three-dimensional space when viewed from a predetermined primary viewing position. If the primary viewing position is along the z-dimension, for example, the shading of a node could be directly dependent on the node's z-coordinate.

The step in box 284 makes a recursive call for the child node being handled, so that position field 188 and color field 194 are similarly completed for each of its children nodes. This recursive call enters the steps in FIG. 10 before box 274 and exits after the test in box 274 indicates that the children are not presented or the test in box 280 indicates that there are no children or that all children have been handled, as shown by the circled letters C and D.

If the root node is shrunken or when all of its children have been handled as described above, the step in box 290 returns the completed linked node data structure. It is now ready for display.

3. Displaying the Structure

The Silicon Graphics workstation on which the invention is implemented provides facilities for presenting images that are perceptible as three-dimensional, and also for allowing the user to perform conventional animated operations such as affine transformations (rotation, translation, and scale) in the perceived three-dimensional space without repositioning of features. These and other facilities are described in *SGI Graphics Library Programming Guide*, Silicon Graphics Inc., Mountain View, Calif., incorporated herein by reference. For example, the Silicon Graphics workstation includes facilities for Z-buffering or hidden surface elimination, making it relatively simple to display a hierarchical structure with perspective and other cues so that it is perceptible as three-dimensional. If such facilities were not available, a similar effect could be obtained by sorting the items to be displayed according to their distance from the viewing position and using a painter's algorithm to paint them from back to front. Another example is the alpha blending facilities used for transparency effects, which can be used on shadows and on the bodies of conic substructures.

Figure 11:
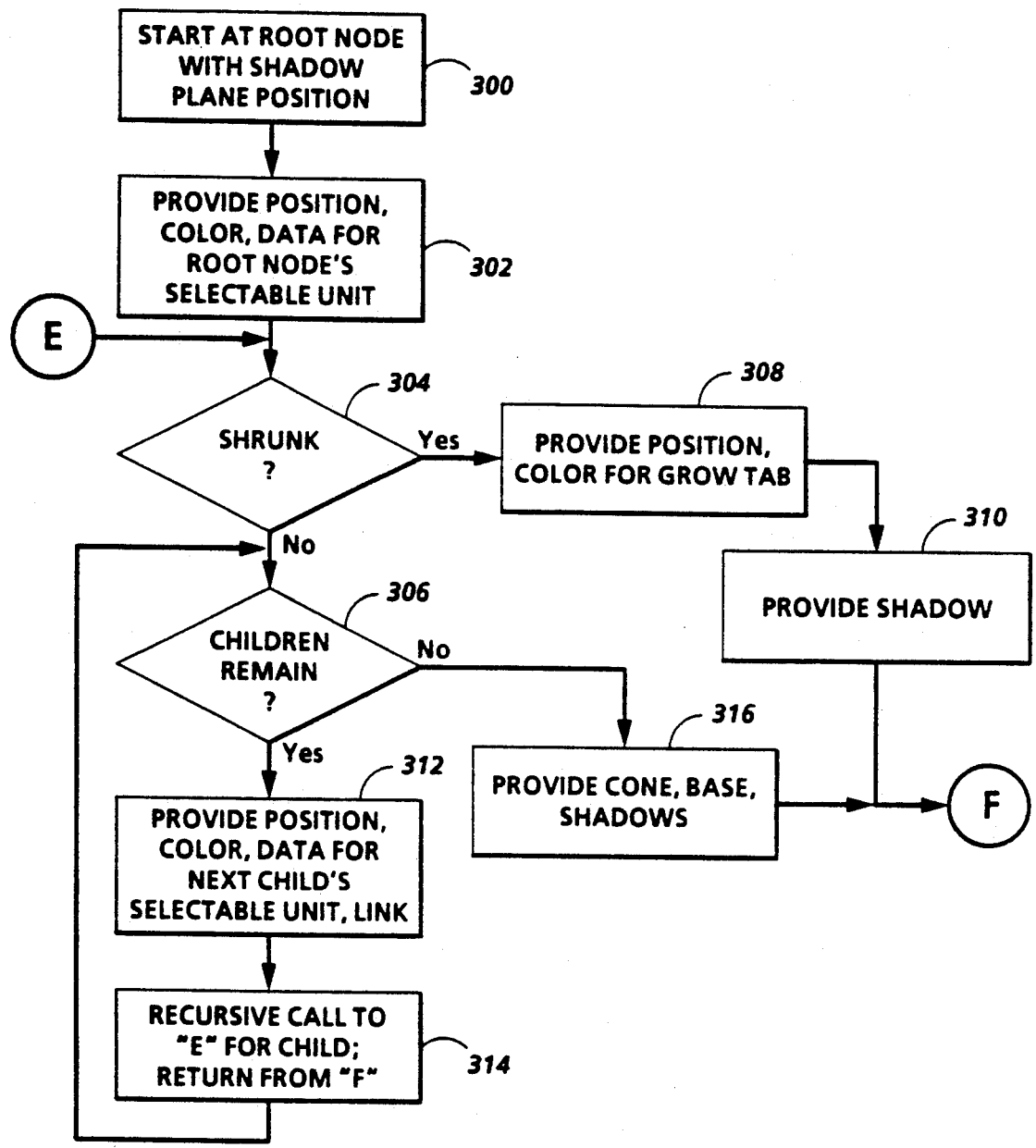
FIG. 11 is a flow chart showing steps in displaying a structure in FIG. 7.

FIG. 11 shows steps in displaying a hierarchical structure. The step in box 300 starts at the root node of a linked node data structure, and also has data indicating the position of a shadow plane, which may be a coordinate indicating a plane that is perceptible as receding from an appropriate edge of the display.

The step in box 302 provides the position, color, and data of the root node for presentation of its selectable unit. As illustrated in FIGS. 1 and 2, the selectable units of the nodes can all be of equal size, in which case it is not necessary to provide data indicating size and shape of each selectable unit. If the conic substructures are vertically oriented as in FIG. 1, the position provided can, for example, be the center of the upper edge of a rectangular selectable unit; if horizontally oriented as in FIG. 2, the position can be the center of the left edge.

The steps in boxes 304 and 306 begin an iterative loop that scans through the data structure, providing data for each node to the three-dimensional image presenting facilities of the workstation.

The step in box 304 determines whether the node currently being handled is shrunken, in which case the step in box 308 provides position and color for a grow tab selectable unit for adding additional links and nodes, as illustrated in FIGS. 1 and 2. The step in box 310 then provides data defining the shadow of the selectable unit, as discussed in greater detail below.

If the node is not shrunken, and if the step in box 306 determines that it has children that have not been handled, the step in box 312 provides position, color, and data for presentation of the next child's selectable unit and of the link to its parent. The link can be presented in the same color as the selectable unit or in a related color. Then, the step in box 314 makes a recursive call for the child node being handled, to provide position, color, and data for presentation of each of its children nodes. This recursive call enters the steps in FIG. 11 before box 304 and exits after box 310 or box 316, as shown by the circled letters E and F.

When all the children of a node have been handled in this manner, the step in box 316 provides additional features of the conic substructure depending from the node, including features indicating the shape and coloration of a cone, of the cone's base, and of the cone's shadow on the shadow plane. Rather than providing the body of the cone with 80 narrow triangles to obtain a circular cone, it is simpler to provide a polygonal base and cone with as many sides as there are nodes. The shadows and other colors can be combined through alpha blending, performed automatically by the Silicon Graphics workstation.

As noted above, the steps in boxes 310 and 316 provide shadows for display. Shadows can be used to provide depth cues that assist the user in perceiving an image as three-dimensional, and also to provide information about the hierarchical structure with which they are displayed. Conventional techniques for providing shadows redraw the shadowed structure with one dimension collapsed, as described in Tessman, T., "Casting Shadows on Flat Surfaces," *IRIS Universe*, Winter 1989, pp. 16 and 18-19. As described below, the steps in boxes 310 and 316 can provide shadows more simply.

Figure 12:
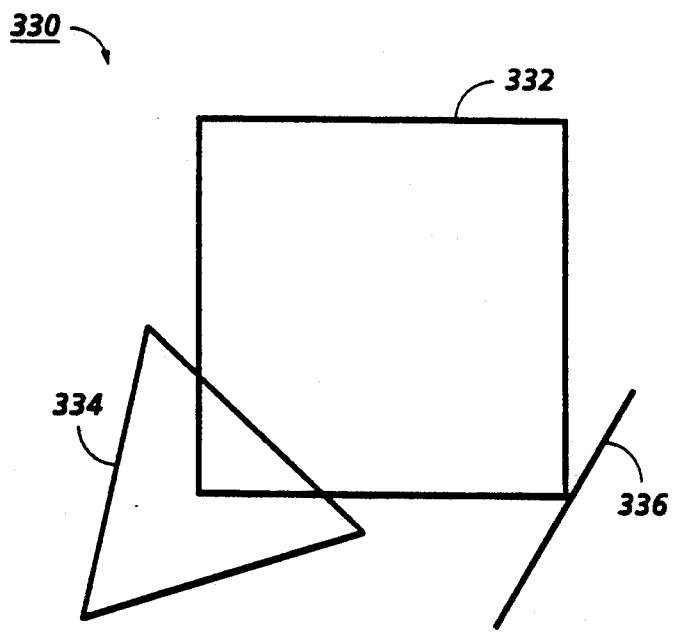
FIG. 12 is a schematic diagram of shadows presented with a structure with conical substructures that can rotate about vertical axes.
Figure 13:
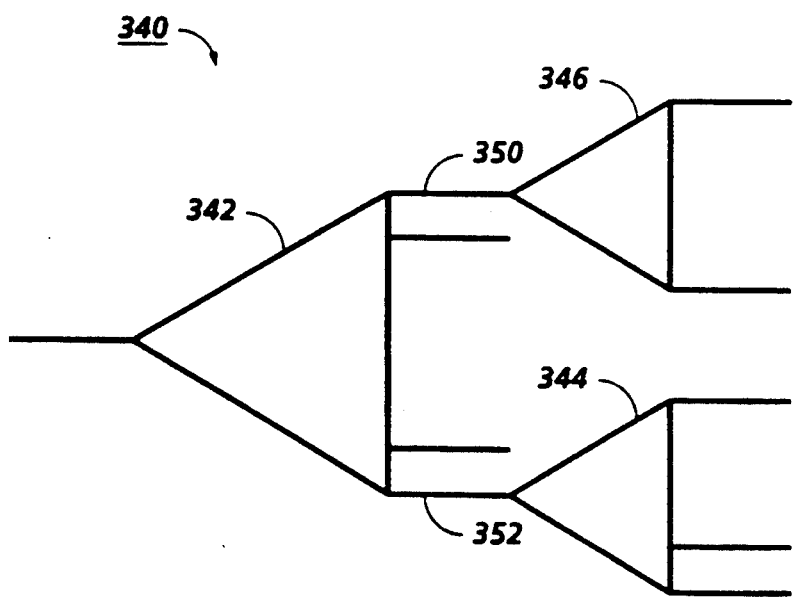
FIG. 13 is a schematic diagram of shadows presented with a structure with conical substructures that can rotate about horizontal axes.

FIG. 12 shows outlines of shadows presented on a shadow plane that is perpendicular to the axes of the conic substructures, which has been implemented for structures whose conic substructures are vertically oriented. FIG. 13 shows outlines of shadows presented on a shadow plane that is parallel to the axes of the conic substructures, which has been implemented for structures whose conic substructures are horizontally oriented. In each case, the shadows shown correspond to the conic substructures in the upper levels of the hierarchical structures in FIGS. 1 and 2.

Shadow pattern 330 in FIG. 12 includes rectangular outline 332 for conic substructure 12 with four children nodes, triangular outline 334 for conic substructure 14 with three children nodes, and line 336 for conic substructure 16 with two children nodes. The shapes of the shadow outlines thus indicate the number of children nodes for each conic substructure, and the sizes of each shadow indicates the hierarchical level of the respective conic substructure. The shapes and sizes of the shadows are the same as for the bases of the conic substructures, but with the shadow plane coordinate.

Shadow pattern 340 in FIG. 13 includes triangular outlines 342, 344, and 346 for conic substructures 62, 64, and 66, respectively. Shadow pattern 340 also includes a respective line for each node's selectable unit, including line 352 for node 78 and line 350 for node 96. The positions of the outlines indicate the hierarchical levels of the respective conic substructures, and the numbers of lines indicate the numbers of nodes in each substructure. The shapes of the triangular outlines can be obtained by recording the minimum and maximum z-coordinates of the children nodes, so that each triangular outline is drawn in the shadow plane with vertices at the position of the bottom of the parent node's selectable unit and at the positions of the children nodes with the minimum and maximum z-coordinates. The selectable units can be drawn by projecting lines parallel to the axis from the position of each child node.

As can be seen from FIGS. 12 and 13, the shadows provide a view of the structure that provides some information about its hierarchy and about the clustering of nodes within the hierarchy. The shadow plane can also conveniently include selectable units such as buttons for navigation or other purposes.

4. Rotation Operations

Figure 14:
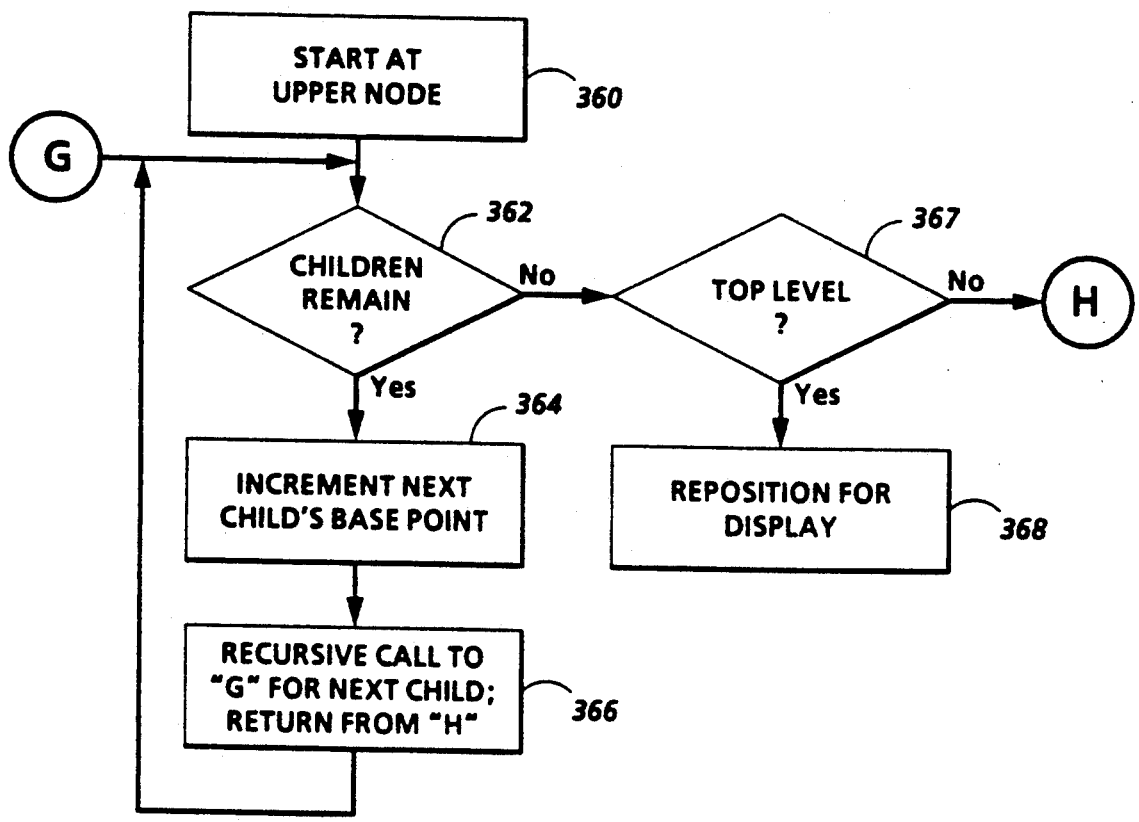
FIG. 14 is a flow chart showing steps within an animation step that rotates all or part of a hierarchical structure.
Figure 15:
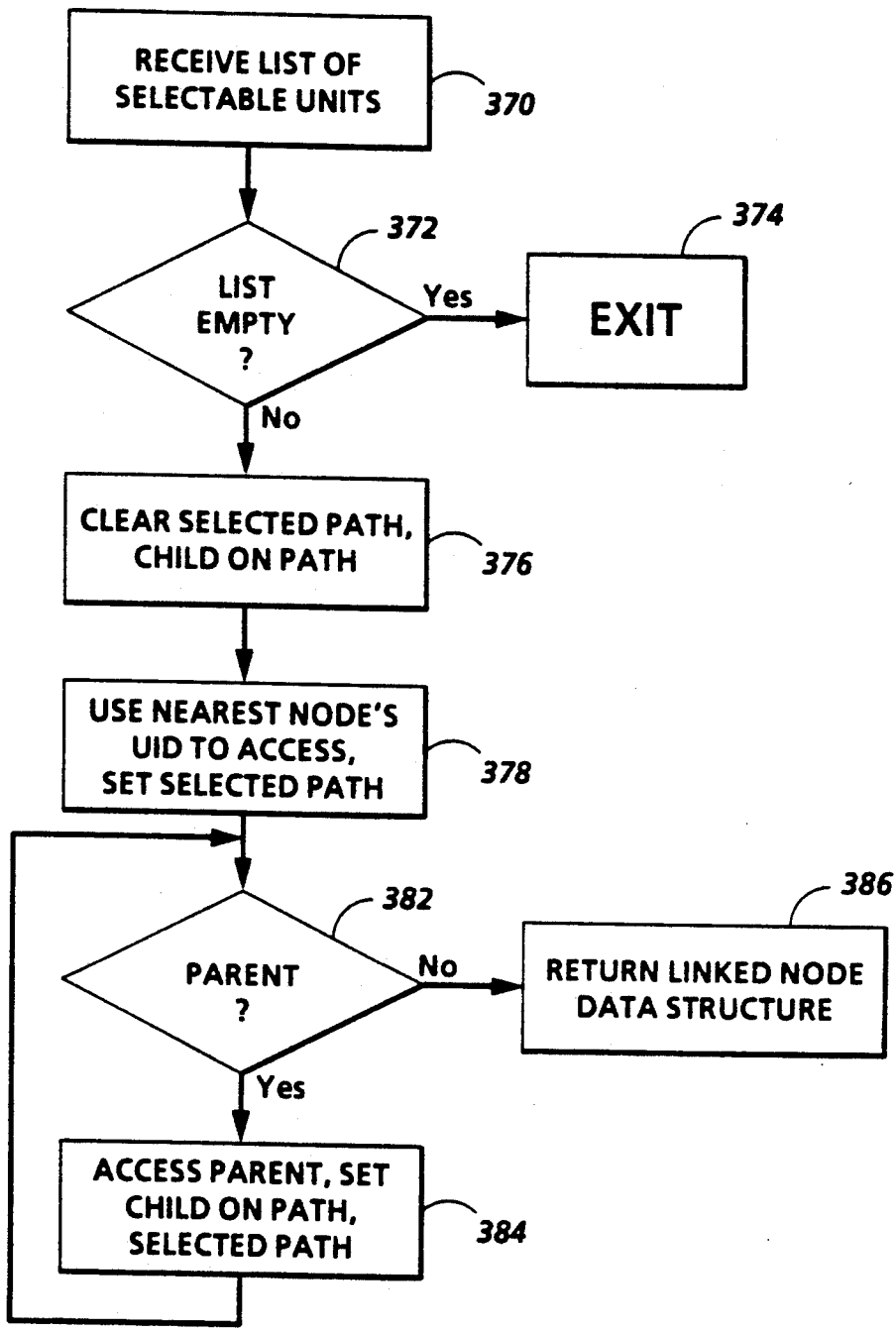
FIG. 15 is a flow chart showing steps in responding to a request for rotation in FIG. 7.
Figure 16:
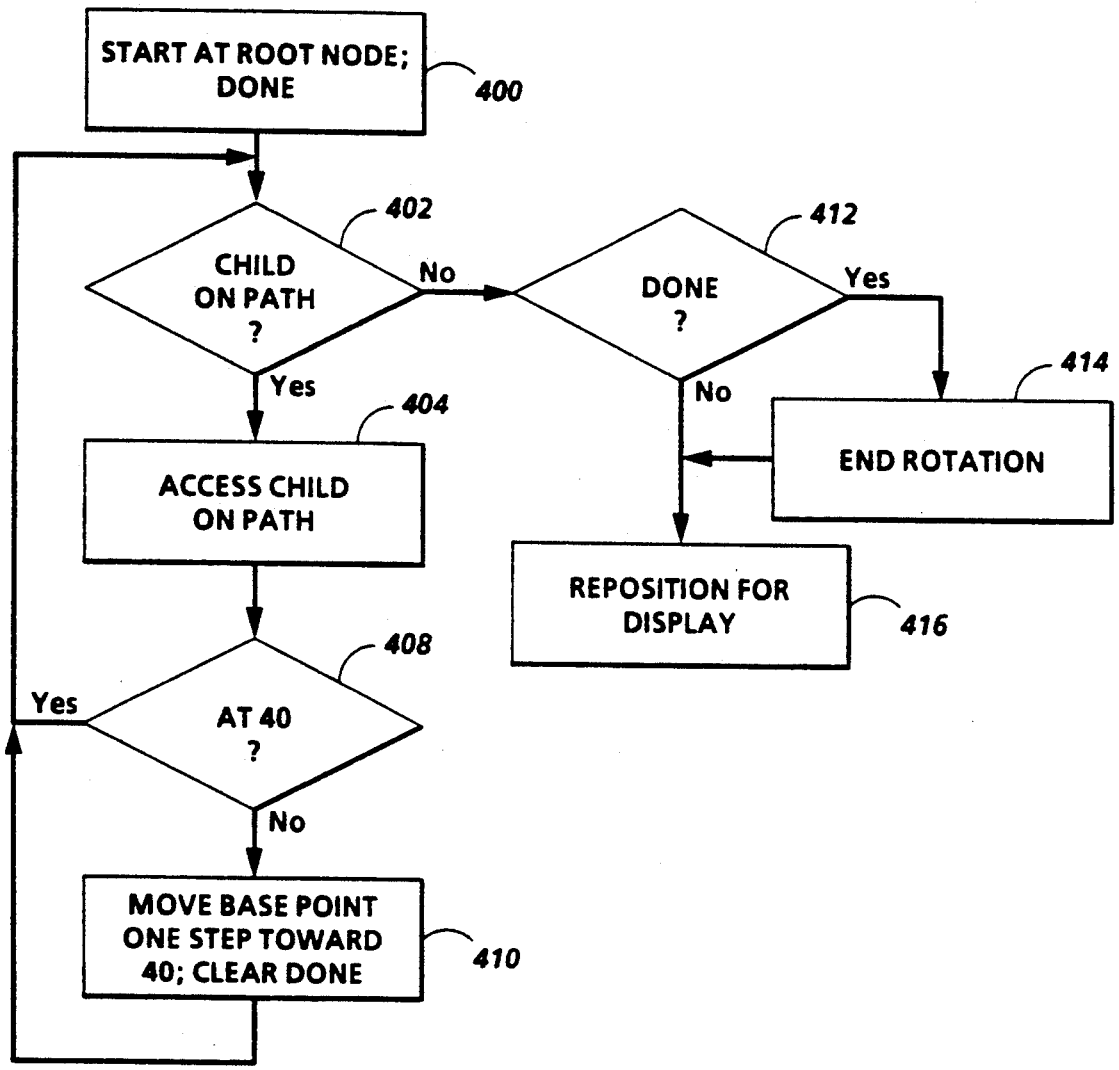
FIG. 16 is a flow chart showing steps in within an animation step that moves a node toward the primary viewing position.

The current implementation provides two broad types of rotation operations. In a first type of rotation, the conic substructures in all or part of the hierarchical structure each rotate by one base point in a clockwise direction for each animation step. In a second type of rotation, an indicated node is moved to a primary viewing position by a combination of rotations of conic rotations. FIG. 14 shows steps in an animation step during rotation of the first type. FIG. 15 shows steps in finding a selected path from an indicated node to the root node when the user requests the second type of rotation. FIG. 16 shows steps in an animation step during rotation of the second type.

Both types of rotation as well, as other operations such as translation, rotation, and scale, can be performed by animated steps, implemented as described in Robertson, G. G., Card, S. K., and Mackinlay, J. D., "The Cognitive Coprocessor Architecture for Interactive User Interfaces," *Proceedings of the ACM SIGGRAPH Symposium on User Interface Software and Technology*, Williamsburg, Va., Nov. 13-15, 1989, pp. 10-18, incorporated herein by reference. In addition to the steps described below, each animation loop includes a number of other steps, and ends with a call to display the hierarchical structure as modified by the animation loop.

FIG. 14 illustrates steps in an animation loop that rotates each mode in all or part of the hierarchical structure by one base point. The step in box 360 starts with the upper node of the part of the hierarchical structure being rotated, which is the root node if the entire structure is rotated. The step in box 362 begins an iterative loop that handles all the children of the current node. The step in box 364 increments the next child's base point field 196, or, if the base point field indicates that the node has no siblings, leaves it unchanged. The step in box 366 makes a recursive call for the next child node, which enters the steps in FIG. 14 before box 362 and exits after box 367, as shown by the circled letters G and H. When all the nodes have been incremented, the step in box 367 determines whether the upper node has been reached. If not, the routine returns at H, but if so, the step in box 368 requests repositioning for display, which is performed with the steps in FIG. 10.

FIGS. 15 and 16 illustrate the second type of rotation, which can be requested by indicating a displayed node to be moved to the primary viewing position. When a user indicates a position on the display of the Silicon Graphics workstation with a pointing device such as a mouse, the workstation's picking facilities provide a list of selectable units at the indicated position, which is received in the step in box 370 in FIG. 15. The test in box 372 determines whether the list is empty, and if it is, the step in box 374 exits to wait for the next user request.

If the list includes one or more selectable units, and if the nearest one is a node's selectable unit rather than one of the other selectable units, the system responds by moving the node's selectable unit to the primary viewing position, and the remaining steps in FIG. 15 prepare the linked node data structure for this operation.

The step in box 376 clears the previous selected path and child on path data from fields 198 and 200 in each item in the data structure. The step in box 378 then uses the UID of the nearest node on the list to find its item in the data structure, whose selected path field is then set to indicate that it is on the selected path.

The step in box 382 begins an iterative loop that continues until the root node is reached, accessing the items in the linked node data structure for each node in the selected path. The step in box 382 tests whether the current node has a parent by accessing its parent's UID field 184. If so, the step in box 384 accesses the parent node's item, sets its child on path field 200 to indicate the child on the selected path, and sets its selected path field 198 to indicate that it is on the selected path. When the root node is reached, the step in box 386 returns the linked node data structure for subsequent operations.

FIG. 16 shows steps in an animation loop that rotates conic substructures to move a node to the primary viewing position. The step in box 400 starts with the root node and with a Done variable set to indicate that the rotation is completed. The test in box 402 determines whether the node currently being handled has a child on the selected path. If so, the child's item in the linked node data structure is accessed in box 404 and the test in box 408 determines whether its base point has reached 40, the primary viewing position. If so, the animation loop proceeds to the test in box 402 for the child node, to see if it has a child on the path.

If a node has not yet reached the primary viewing position, the step in box 410 moves its base point by one step toward 40 (by either addition or subtraction) and clears the Done variable; one step may be three base points, or, if the node is already within three of 40, the number necessary to move it to 40. In this way, each node is moved in whichever direction will bring it most quickly to the primary viewing position, and two conic substructures may rotate in opposite directions.

When the lowest node in the path is reached, the step in box 412 determines whether the rotation is completed by testing the Done variable. If it has not been cleared, the rotation request is cleared in box 414 before calling the steps in FIG. 10 to reposition the nodes for display.

The rotation request could also be cleared whenever the user requests any other operation, to ensure that the user always has interactive control over the display. When no request is received from the user and no animation is in progress, the system can go into an idle mode in which the animation loop is not performed until the user makes another request.

In general, to allow interactive control at all times, the animation loop should be set up so that any long process is broken up into small steps, between which the process can be interrupted.

The rate at which the animation loops are performed should be sufficiently slow to allow the necessary computation but sufficiently fast so that conic substructures rotate perceptibly. The necessary computation depends, of course, on the complexity of the hierarchical structure. If the computation is so great that it would slow the repositioning and display operations, governor techniques can be use to reduce the amount of repositioning, thereby sacrificing detail in the image for steady animation. Governor techniques could also be used to increase the size of steps in rotation, to ensure that the motion being presented can be performed in a given amount of time, as measured by the workstation's clock.

5. Other Operations

Various other operations could be available to the user for manipulating the hierarchical structure. These operations could be invoked by appropriate signals from a user input device, such as signals indicating selection of a selectable unit such as a menu item, signals indicating a gesture requesting an operation, or signals indicating a typed command requesting an operation. If a mouse with multiple buttons is used, one button can be used to request display of a menu and to select a menu item, another to select a node to be moved to the primary viewing position or to gesture and perform other selection operations.

Figure 17:
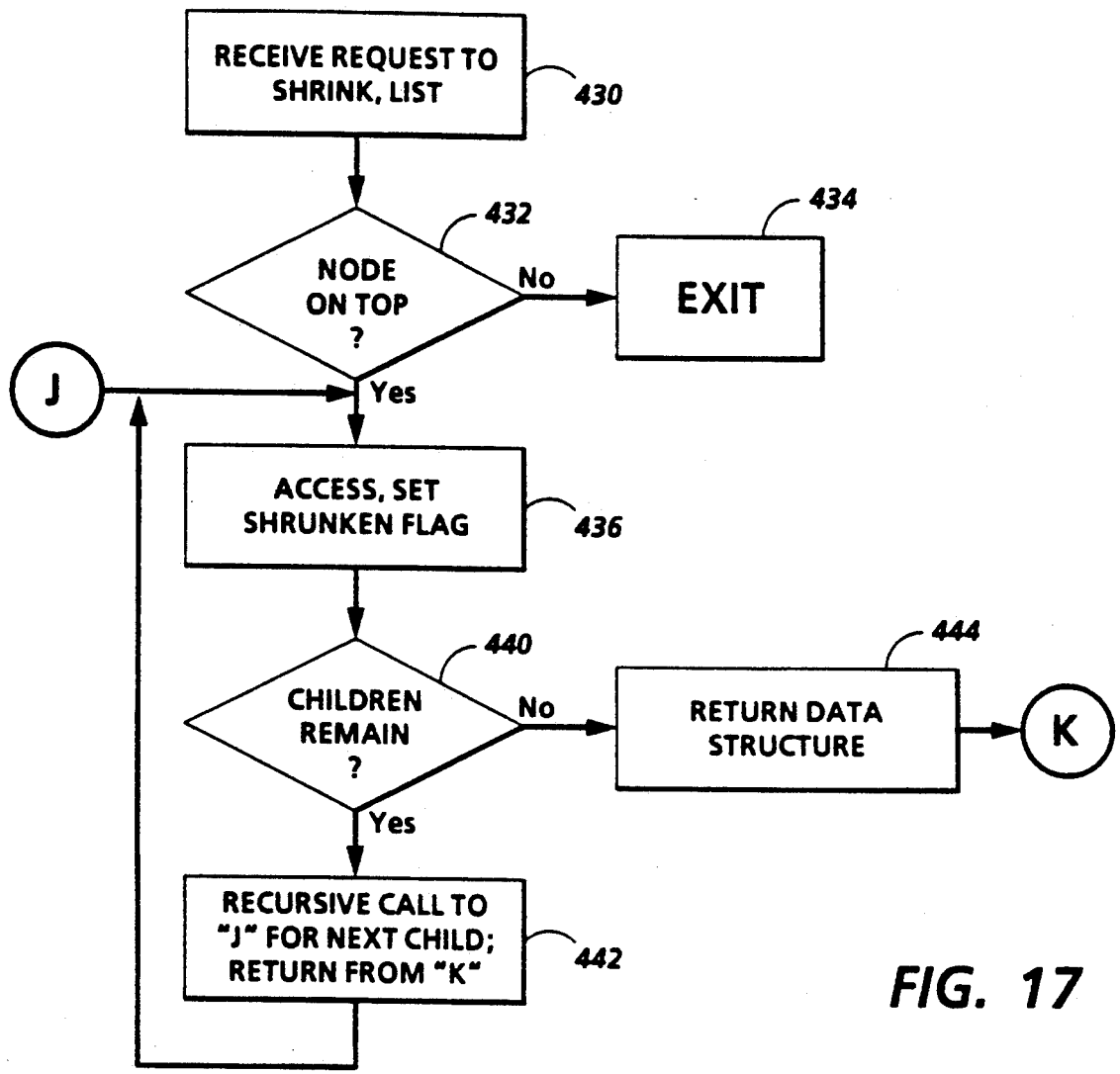
FIG. 17 is a flow chart showing steps in growing a structure by presenting an additional substructure.
Figure 18:
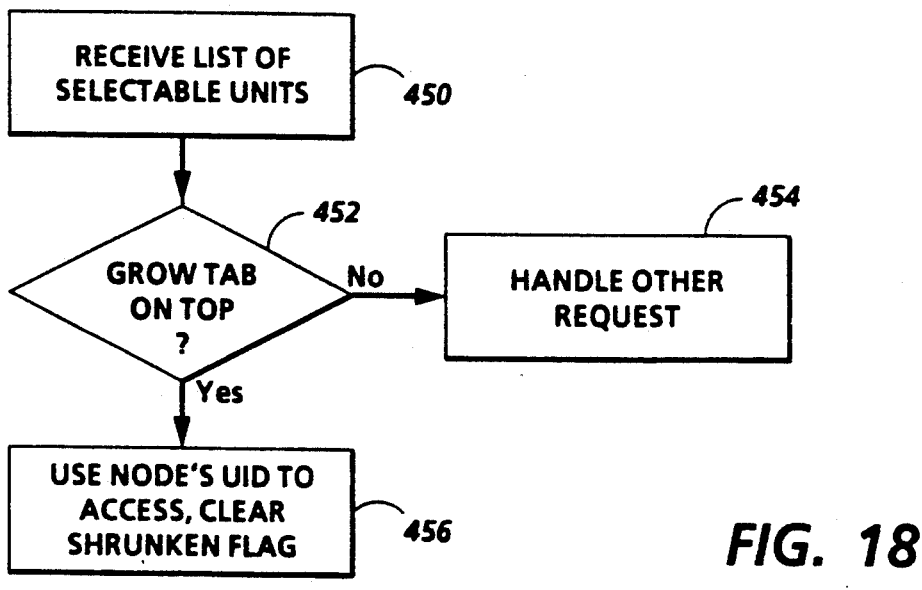
FIG. 18 is a flow chart showing steps in shrinking a structure by ending presentation of a substructure.

Two operations that assist a user in controlling the display of the hierarchical structure are grow and shrink operations. These operations assist the user in viewing the relevant part of the hierarchical structure. FIG. 17 shows steps in an example of a shrink operation and FIG. 18 shows steps in an example of a grow operation.

The step in box 430 in FIG. 17 receives a request to perform a shrink operation together with a list of selectable units at a position indicated by the user from the workstation's picking facilities. The step in box 432 tests whether the list has at least one selectable unit and whether the nearest selectable unit on the list is a node. If not, a shrink operation cannot be performed, so the step in box 434 exits, providing a failure signal if appropriate.

When a shrink operation can be performed, the step in box 436 uses the UID of the node being handled to access the node's item in the linked node data structure and sets the node'shrunken flag 192. Upon finding the node's shrunken flag 192 set, the steps in FIG. 11, during the next redisplay of the hierarchical structure, display a grow tab selectable unit and do not present the node's children.

The step in box 436 begins an iterative loop that handles each of the children of the current node, making a recursive call in box 442 that enters and exits as shown at J and K. When the step in box 440 determines that all of the children of the node have been handled, the step in box 444 returns the data structure.

The step in box 450 in FIG. 18 receives a list of selectable units at a position indicated by the user from the workstation's picking facilities. The step in box 452 branches based on whether the list has at least one selectable unit and whether the nearest selectable unit on the list is a grow tab, indicating a request for a grow operation. If not, another request made by the user is handled in box 454.

When a grow operation is requested, the step in box 456 obtains the UID of the grow tab's node and uses it to access the node's item in the linked node data structure. This step also clears the node's shrunken flag 192. Upon finding the node's shrunken flag 192 cleared, the steps in FIG. 11, during the next redisplay of the hierarchical structure, present the node's children and their links. Because the children's shrunken flags have been set by the steps in FIG. 17, however, their children are not presented.

A user could request a grow or shrink operation in other ways, such as by a gesture or selection of a menu item. A variety of related operations can be implemented, including an operation that shrinks the entire structure to the root node, an operation that grows all of the grow tabs in the structure, an operation that shrinks all of the siblings of a selected node but not the selected node, and an operation that grows all of the levels of nodes that depend from a grow tab rather than just the first level as in FIG. 18.

6. System Features

Figure 19:
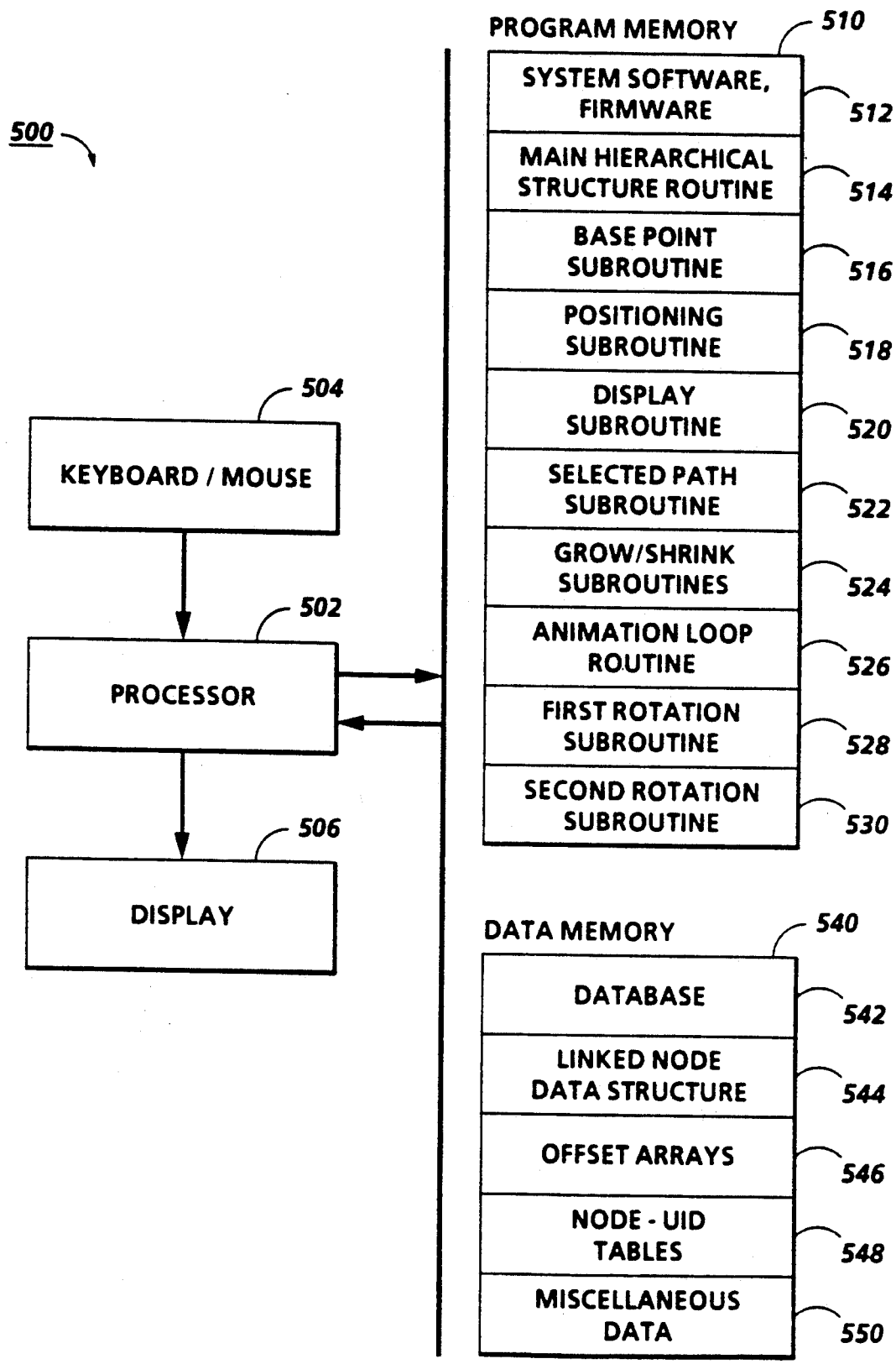
FIG. 19 is a schematic block diagram showing components of a system implementing the invention.

FIG. 19 shows components of system 500 implementing the features described above. System 500 includes processor 502, which could be any processor and could include one or more CPUs and may include specialized hardware such as one or more coprocessors to provide specific functions. Processor 502 is connected for receiving signals based on user input actions from a user input device that includes keyboard and mouse 504, and is also connected for providing image data to an image output device that includes display 506. Processor 502 is also connected for accessing program memory 510 and data memory 540.

Program memory 510 includes instructions executed by processor 502 during its operation, including the following: Underlying system software and firmware 512 provide the operating system and other facilities of system 500. Main hierarchical structure routine 514 is called and performed when the user requests presentation of a hierarchical structure, and can include steps like those in FIG. 7. Base point subroutine 516, called by main routine 514, assigns base points to nodes in the hierarchical structure, and can include steps like those in FIG. 9. Positioning subroutine 518, called by main routine 514, assigns positions to nodes, and can include steps like those in FIG. 10. Display subroutine 520, called by main routine 514, provides nodes for display, and can include steps like those in FIG. 11. Selected path subroutine 522, called when the user requests movement of a node to the primary viewing position, finds the path from the node indicated to the root node, and can include the steps in FIG. 15. Grow/shrink subroutines, called when the user requests a growing or shrinking operation, can include the steps of FIGS. 17 and 18. Animation loop routine 526, periodically executed, calls first rotation subroutine 528, which can include the steps of FIG. 14, and second rotation subroutine 530, which can include the steps of FIG. 16.

Data memory 540 includes data structures accessed by processor 502 during execution of instructions in program memory 510, including the following: Database 542 is an underlying data structure accessed by main routine 514. Linked node data structure 544 is produced by main routine 514 based on database 542 and is used by most of the other routines shown. Database 542 can thus have any form that admits of the production of a linked node data structure relating to its contents. Offset arrays 546 are produced and used by positioning subroutine 518. Node-UID tables 548 are set up by system software 512 to map between selectable units and the UIDs of their respective nodes. Miscellaneous data 550 includes values and other data that is used in executing instructions in program memory 510.

D. Miscellaneous

The invention could be implemented in many ways on a variety of machines. Some features might be implemented differently than described above to take advantage of specialized hardware or software available on a specific machine.

The invention has been described in terms of conic substructures that are perceptible as rotating. The invention could also be implemented with conic substructures that are not perceptible as rotating but that define paths along which nodes and links are perceptible as moving. For example, to improve the use of screen display space, a fixed elliptical or other oblong shape might be chosen for the conic substructures. This might reduce the extent to which nodes that are perceptible as near obscure nodes that are perceptible as distant. In moving to the primary viewing position, a node would follow the base of the conic substructure, but the conic substructure itself would not rotate. As described above, base points on the base of the conic substructure could be precomputed and used in moving a node to the primary viewing position.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method of operating a processor connected for providing image data to an image output device that includes a display, the image output device presenting images on the display in response to the image data, the processor further being connected for accessing a first level data structure, the method comprising steps of:

providing first image data so that the image output device presents a first image, the first image including a first hierarchical structure that is perceptible as three-dimensional; the first structure including a first plurality of nodes and a first plurality of links, each of the first plurality of links being perceptible as connecting one of the first plurality of nodes to another of the first plurality of nodes, the first structure further including a plurality of levels, a subset of the first plurality of nodes and the first plurality of links forming a first cone-like substructure at a first one of the levels of the first structure, the step of providing the first image data comprising a substep of determining a position of the first cone-like substructure and including in the first level data structure position data indicating the position of the first cone-like substructure; and providing second image data so that the image output device presents a second image, the second image including a second hierarchical structure that is perceptible as three-dimensional and that is perceptible different than the first structure; the second structure including a second plurality of nodes and a second plurality of links, each of the second plurality of links being perceptible as connecting one of the second plurality of nodes to another of the second plurality of nodes; the second structure further including a plurality of levels, each of the second plurality of nodes being perceptible as a continuation of a respective one of the first plurality of nodes, each of the second plurality of links being perceptible as a continuation of a respective one of the first plurality of links, so that the levels of the second structure are perceptible as continuations of the levels of the first structure; a subset of the second plurality of nodes and the second plurality of links forming a second cone-like substructure, the step of providing the second image data comprising the substep of accessing the first level data structure and determining the position of the second cone-like substructure using the position data.

2. The method of claim 1 in which the second cone-like substructure is perceptible as a rotated continuation of the first cone-like substructure, the rotation being about an axis, the position data indicating the position of the first cone-like substructure relative to the axis.

3. A method of operating a processor connected for providing image output data to an image output device that includes a display and also connected for receiving signals from a user input device, the image output device presenting images on the display in response to the image output data, the method comprising:

a step of providing initial image output data so that the image output device presents an initial image, the initial image including an initial structure that is perceptible as three-dimensional, the initial structure including a plurality of initial nodes and a plurality of initial links, each of the initial links being perceptible as connecting one of the initial nodes to another of the initial nodes; the initial structure including an initial cone-like substructure having a vertex and having a directrix that is circular or polygonal, the plurality of initial nodes including an initial parent node at the vertex and a plurality of initial children nodes on the directrix, the plurality of initial links including, for each of the initial children nodes, a respective link in the initial cone-like substructure, the respective link being perceptible as connecting the initial parent node to the initial children node;

a step of receiving a signal from the user input device indicating one of the initial children nodes; the indicated one of the initial children nodes being at an initial position within the initial structure; and in response to the signal from the user input device, a plurality of image output steps performed in sequence, each image output step providing respective image output data so that the image output device presents a respective image, the respective image of each step including a respective structure that is perceptible as three-dimensional, each respective structure including a respective plurality of nodes and a respective plurality of links, each of the respective links being perceptible as connecting one of the respective nodes to another of the respective nodes; each image output step's structure including a respective cone-like substructure having a vertex and having a directrix that is circular or polygonal, the step's plurality of nodes including a respective parent node at the vertex and a plurality of respective children nodes on the directrix, the step's plurality of links including, for each of the step's children nodes, a respective link in the step's cone-like substructure, the respective link being perceptible as connecting the step's parent node to the children node;

the sequence of image output steps including a following step and a preceding step; each of the respective nodes of the following step being perceptible as a continuation of one of the respective nodes of the preceding step, each of the respective links of the following step being perceptible as a continuation of one of the respective links of the preceding step; the following step's cone-like substructure being perceptible as a rotated continuation of the preceding step's cone-like substructure;

the children nodes of each of the image output steps including a respective continued node, each image output step's continued node being perceptible as a continuation of the indicated one of the initial children nodes, moved from the initial position toward a final position.

4. The method of claim 3 in which the sequence of image output steps includes a last step; the respective structure of the last step including a primary viewing position which is the final position.

5. A method of operating a processor connected for providing image data to an image output device that includes a display and also connected for receiving signals from a user input device, the image output device presenting images on the display in response to the image data, the method comprising the steps of:

providing first image data so that the image output device presents a first image, the first image including a first hierarchical structure that is perceptible as three-dimensional, the first structure including a first plurality of nodes and a first plurality of links, each of the first plurality of links being perceptible as connecting one of the first plurality of nodes to another of the first plurality of nodes; the first structure including a first cone-like substructure having a vertex and having a directrix that is circular or polygonal, the first plurality of nodes including a first parent node at the vertex and a plurality of first children nodes on the directrix, the first plurality of links including, for each of the first children nodes, a respective link in the first cone-like substructure, the respective link being perceptible as connecting the first parent node to the first children node;

receiving a signal from the user input device indicating one of the first children nodes; the indicated one of the first children nodes being at an initial position within the first structure; and in response the signal from the user input device, providing second image data so that the image output device presents a second image, the second image including a second hierarchical structure that is perceptible as three-dimensional; the second structure including a second plurality of nodes and a second plurality of links, each of the second plurality of links being perceptible as connecting one of the second plurality of nodes to another of the second plurality of nodes; each of the second plurality of nodes being perceptible as a continuation of a respective one of the first plurality of nodes, each of the second plurality of links being perceptible as a continuation of a respective one of the first plurality of links; the second structure including a second cone-like substructure having a vertex and having a directrix that is circular or polygonal, the second plurality of nodes including a second parent node at the vertex and a plurality of second children nodes on the directrix, the second plurality of links including, for each of the second children nodes, a respective link in the second cone-like substructure, the respective link being perceptible as connecting the second parent node to the second children node; the second cone-like substructure being perceptible as a rotated continuation of the first cone-like substructure; the second children nodes including a continued node that is perceptible as a continuation of the indicated one of the first children nodes, moved from the initial position toward a final position within the second structure.

6. The method of claim 5 in which each link of the first and second pluralities of links is perceptible as having a length, the perceptible length of each of the second plurality of links being the same as the perceptible length of the respective one of the first plurality of links.

7. The method of claim 5 in which the first and second structures have equal numbers of hierarchical levels.

8. The method of claim 5 in which the first structure further includes a third cone-like substructure and the second structure further includes a fourth cone-like substructure that is perceptible as a rotated continuation of the third cone-like substructure; the perceptible rotation from the first cone-like substructure to the second cone-like substructure being about a first axis and the perceptible rotation from the third cone-like substructure to the fourth cone-like substructure being about a second axis, the first and second axes of perceptible rotation being parallel.

9. The method of claim 8 in which the first and second axes are vertical.

10. The method of claim 8 in which the first and second axes are horizontal.

11. The method of claim 5 in which all of the respective links in the first cone-like substructure are perceptible as being of equal length.

12. The method of claim 5 in which the first cone-like substructure is perceptible as having an axis and a profile shape in a first plane that includes the axis, the first image further including a first projected shape that is perceptible as a projection of the profile shape of the first cone-like substructure onto a second plane.

13. The method of claim 12 in which first and second ones of the respective links have positions that define the profile shape in the first plane and the second plane is perceptible as parallel to the first plane, the step of providing the first image data further comprising the substep of determining the positions of the first and second respective links and using the positions both to prepare first structure data defining the first structure and projection data defining the first projected shape.

14. The method of claim 12 in which one of the children nodes comprises a selectable unit that is perceptible as perpendicular to the first plane and the first plane is parallel to the second plane, the first image further including a second projected shape that is perceptible as a projection of the selectable unit onto the second plane, the second projected shape being a line.

15. The method of claim 5 in which the directrix of the first cone-like substructure forms a base, the base having a perceptible geometric shape lying substantially in a first plane; the first image further including a projected shape that is perceptible as a projection of the geometric shape of the base onto a second plane.

16. The method of claim 15 in which the geometric shape of the base lies entirely in the first plane and the second plane is perceptible as parallel to the first plane, the step of providing the first image data further comprising the substep of determining the geometric shape of the base and using the geometric shape both to prepare first structure data defining the first structure and projection data defining the projected shape.

17. The method of claim 5 in which the first and second structures each have hierarchical levels that include an upper level and a lower level, the first and second cone-like structures being included in the upper levels of the first and second structures respectively, the first structure further including a first lower cone-like substructure in the lower level, the second structure further including a second lower cone-like substructure in the lower level; the first and second lower cone-like substructures each having a vertex, the vertices of the first and second lower cone-like substructures respectively being on the bases of the first and second cone-like substructures;

the second lower cone-like substructure being perceptible as a rotated continuation of the first lower cone-like substructure; the perceptible rotation from the first lower cone-like substructure to the second lower cone-like substructure being concurrent with the perceptible rotation from the first cone-like substructure to the second cone-like substructure.

18. The method of claim 17 in which the perceptible rotation from the first cone-like substructure to the second cone-like substructure and from the first lower cone-like substructure to the second lower cone-like substructure is one of a plurality of steps in a sequence of perceptible rotations by which the indicated one of the first children nodes reaches the final position; the perceptible rotation from the first cone-like substructure to the second cone-like substructure being in a first direction of rotation and the perceptible rotation from the first lower cone-like substructure to the second lower cone-like substructure being in a second direction of rotation; the step of providing the second image data comprising the substep of selecting the first and second directions of rotation to reduce the number of steps in the sequence to reach the final position.

19. The method of claim 5 in which the step of providing the first image data comprises providing the first image data so that a selectable one of the first plurality of nodes includes a first selectable unit, the step of providing the second image data comprising providing the second image data so that a selectable one of the second plurality of nodes includes a second selectable unit; the second selectable unit being perceptible as a continuation of the first selectable unit.

20. The method of claim 19 in which the first and second structures have equal numbers of hierarchical levels including an uppermost level that includes uppermost ones of the first and second pluralities of nodes and a sequence of successively lower levels, the first selectable unit being at one of the lower levels, the first plurality of nodes and the first plurality of links including a path of nodes and links between the first selectable unit and the uppermost one of the first plurality of nodes; the processor further being connected for receiving signals from a user input device; the method further comprising the steps of:

receiving a signal from the user input device indicating the first selectable unit; and in response to the signal indicating the first selectable unit, providing selection image data so that the image output device presents a modified image, the path of nodes and links being presented differently in the modified image than in the first image so that the user can more easily distinguish the path of nodes and links.

21. The method of claim 19 in which the first structure includes a number of hierarchical levels, the first selectable unit being at a first one of the hierarchical levels, the processor further being connected for receiving signals from a user input device; the method further comprising the steps of:

receiving a signal from the user input device indicating the first selectable unit; and in response to the signal indicating the first selectable unit, providing expanded image data so that the image output device presents a modified image, the modified image including a second hierarchical level below the first hierarchical level, the second hierarchical level including an additional link and an additional node not in the first plurality of links and the first plurality of nodes; the additional link being perceptible as connecting the selectable node to the additional node.

22. The method of claim 5 in which the first structure includes a number of hierarchical levels; a first one of the hierarchical levels including a first one of the plurality of nodes; a second one of the hierarchical levels below the first level including a second one of the pluralit of nodes and a descending link that is perceptible as connecting the first node to the second node, the processor further being connected for receiving signals from a user input device; the method further comprising the steps of:

receiving a signal from the user input device requesting that the descending link and the second node not be presented; and in response to the signal, providing reduced image data so that the image output device presents a modified image that does not include the descending link and the second node.

* * * * *